(12) United States Patent
Kenrick

(10) Patent No.: US 10,887,573 B1
(45) Date of Patent: ***Jan. 5, 2021

(54) SYSTEM FOR PROCESSING 2D CONTENT FOR 3D VIEWING

(71) Applicant: Erin Sanaa Kenrick, Colorado Springs, CO (US)

(72) Inventor: David Gerald Kenrick, Denver, CO (US)

(73) Assignee: Erin Sanaa Kenrick, Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/521,339

(22) Filed: Jul. 24, 2019

Related U.S. Application Data

(63) Continuation-in-part of application No. 15/586,260, filed on May 3, 2017, now Pat. No. 10,404,963.

(60) Provisional application No. 62/331,424, filed on May 3, 2016.

(51) Int. Cl.
| | | |
|---|---|---|
| *H04N 13/00* | (2018.01) | |
| *H04N 5/232* | (2006.01) | |
| *H04N 19/44* | (2014.01) | |
| *H04N 19/172* | (2014.01) | |
| *H04N 19/136* | (2014.01) | |
| *G06K 9/36* | (2006.01) | |
| *H04N 13/139* | (2018.01) | |
| *H04N 13/189* | (2018.01) | |
| *H04N 13/194* | (2018.01) | |
| *H04N 13/344* | (2018.01) | |

(52) U.S. Cl.
CPC ......... *H04N 13/139* (2018.05); *H04N 13/189* (2018.05); *H04N 13/194* (2018.05); *H04N 13/344* (2018.05)

(58) Field of Classification Search
CPC .. H04N 13/139; H04N 13/189; H04N 13/344; H04N 13/194
USPC .......................................... 348/43
See application file for complete search history.

(56) References Cited

U.S. PATENT DOCUMENTS

| | | |
|---|---|---|
| 6,445,833 B1 | 9/2002 | Murata et al. |
| 2010/0067873 A1* | 3/2010 | Sasaki .................. H04N 9/8211 386/241 |
| 2016/0241836 A1 | 8/2016 | Cole et al. |

OTHER PUBLICATIONS

U.S. Appl. No. 15/586,260, filed May 3, 2017, Kenrick.

(Continued)

*Primary Examiner* — Hee-Yong Kim
(74) *Attorney, Agent, or Firm* — Jason H. Vick; Sheridan Ross, PC

(57) ABSTRACT

Described here are systems, devices, and method for converting a two-dimensional video sequence into first and second video sequences for display at first and second display areas of a single display. In some embodiments, a two-dimensional video image sequence is received at a mobile device or wearable headset device. The two-dimensional video image sequence may be split into first and second video image sequences such that a first video image sequence is output to the first display area and a second video image sequence different from the first video image sequence is output to the second display area. The first and second video image sequences may be created from the two-dimensional video image sequence.

30 Claims, 16 Drawing Sheets

(56) References Cited

OTHER PUBLICATIONS

Office Action for U.S. Appl. No. 15/586,260, dated Aug. 28, 2018.
Office Action for U.S. Appl. No. 15/586,260, dated Mar. 14, 2019.
Notice of Allowance for U.S. Appl. No. 15/586,260, dated Apr. 25, 2019.

* cited by examiner

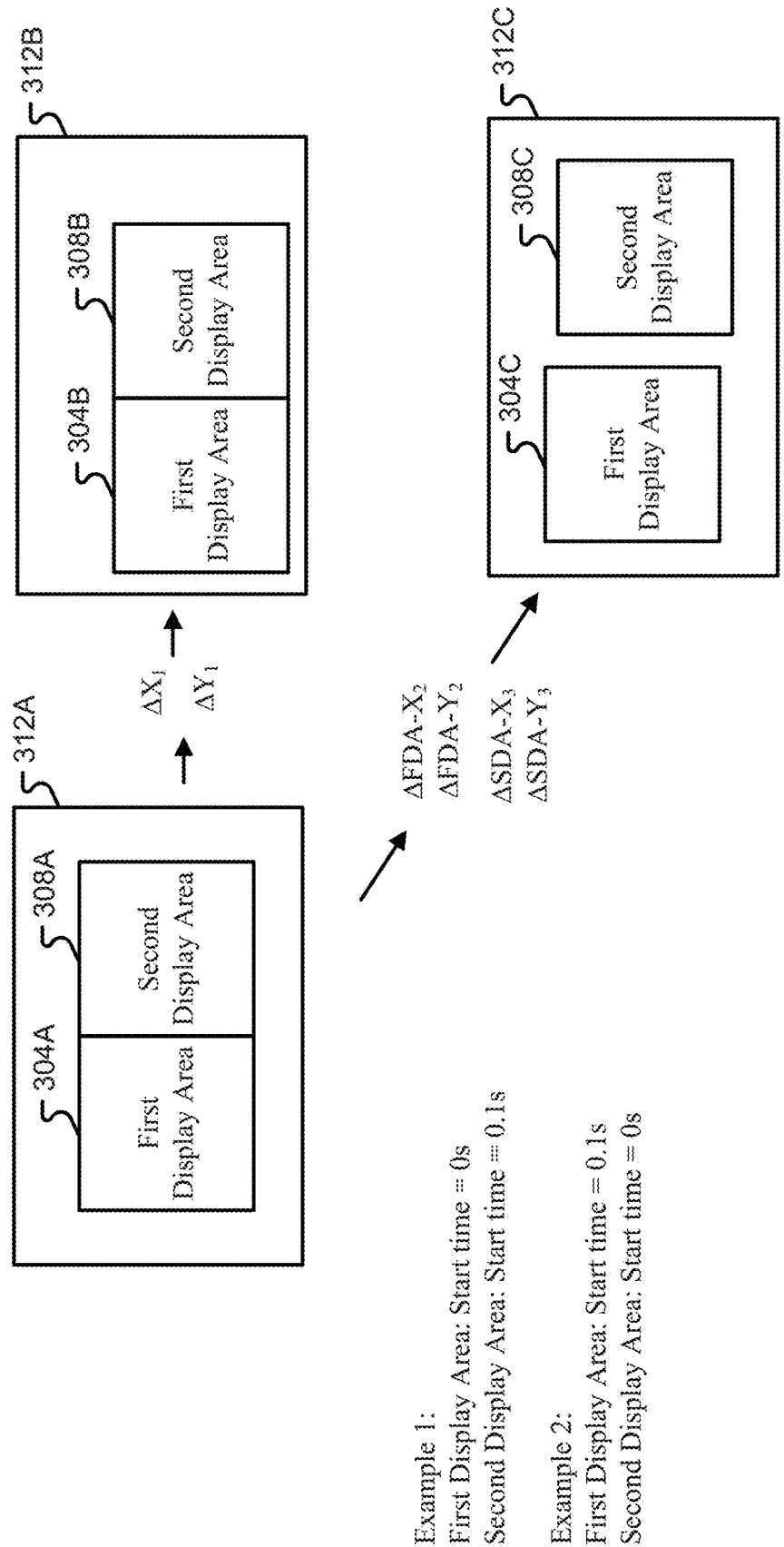

Degree/Magnitude of Change for Pixel/Block/Macroblock
Between Frames
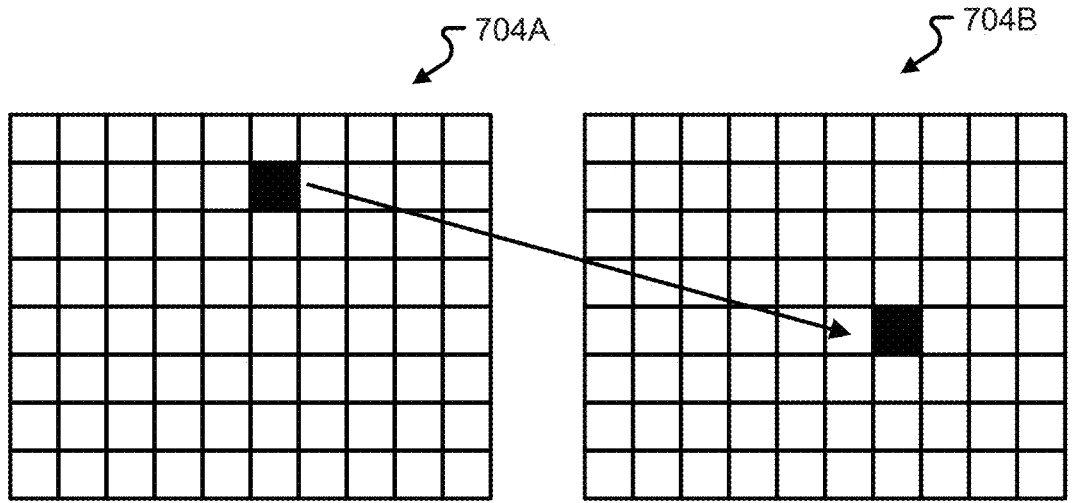
$\Delta X_1 = 1$
$\Delta Y_1 = -3$
# of Pixel/Block/Macroblock
Changes Between Frames
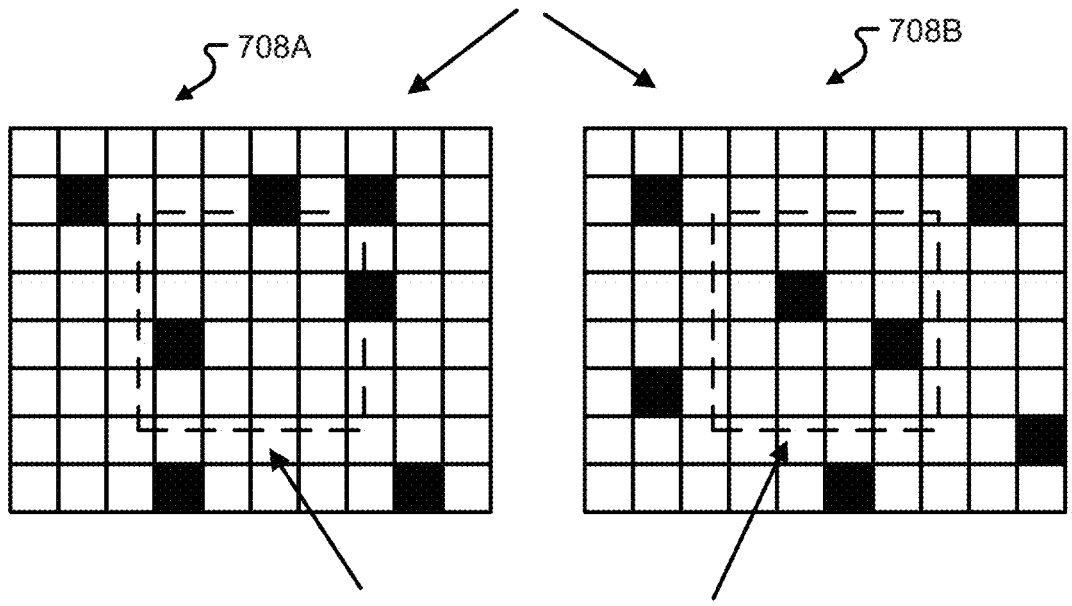
# of Pixel/Block/Macroblock Changes Between Frames in Specific Location
Fig. 7

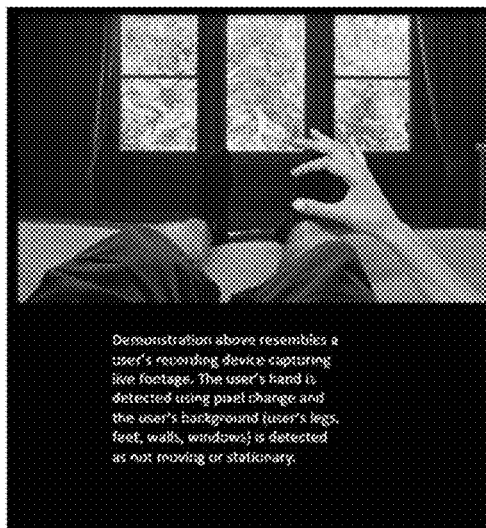
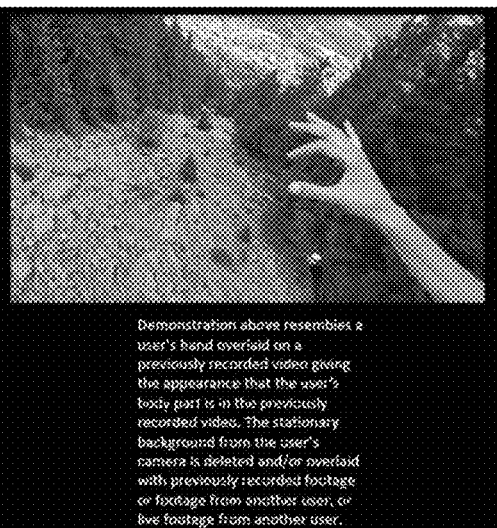
(A)
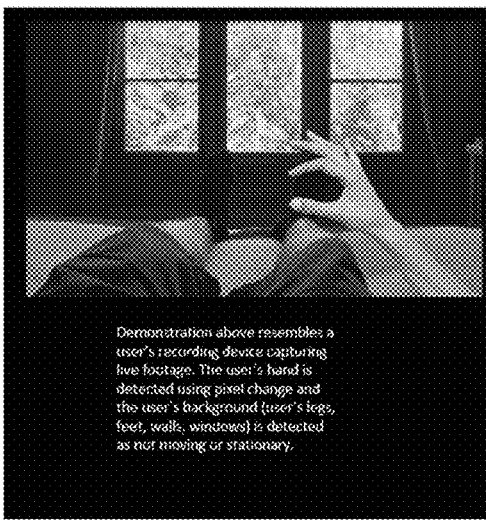
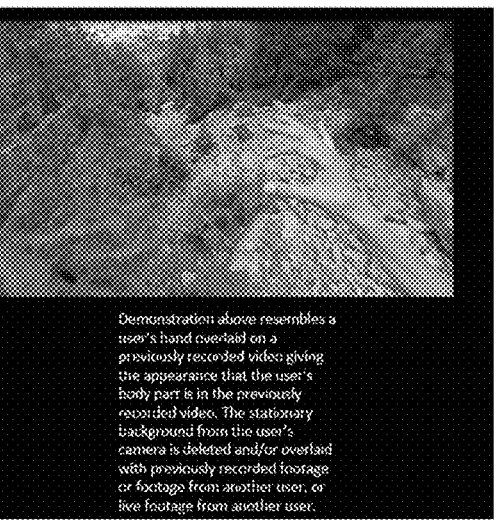
(B)
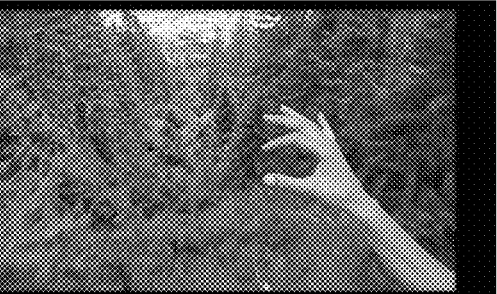
(C)
Figs. 12A-C

As viewed Before Alignment

As viewed After Alignment

User's Point of View Before Alignment

User's Point of View after Alignment

SYSTEM FOR PROCESSING 2D CONTENT FOR 3D VIEWING

CROSS-REFERENCE TO RELATED APPLICATIONS

This is a Continuation-in-Part of U.S. application Ser. No. 15/586,260, filed, May 3, 2017, entitled "System for Processing 2D Content for 3D Viewing", now U.S. Pat. No. 10,404,963, which application claims the benefit of U.S. Provisional Patent Application Ser. No. 62/331,424, filed May 3, 2016, the entire disclosure of each of which is hereby incorporated herein by reference for all that they teaches and for all purposes.

FIELD

The present technology is generally directed toward converting two-dimensional content for three-dimensional display.

BACKGROUND

Existing methods for converting two-dimensional content into three-dimensional content for display and viewing by a viewer generally require the use of specialized software and hardware paired together with three-dimensional glasses worn by the viewer. For example, stereoscopic 3D effects may be achieved by encoding each eye's image using filters of different (usually chromatically opposite) colors, typically red and cyan. Accordingly, stereoscopic 3D images contain two differently filtered colored images, one for each eye. When viewed through color-coded glasses, each of the two images reaches the eye it is intended for, revealing an integrated stereoscopic image. The visual cortex of the brain then fuses this into the perception of a three-dimensional scene or composition. However, the use of three-dimensional glasses tends to be cumbersome. Moreover, means to readily convert any source of two-dimensional content into three-dimensional content for viewing without utilizing sophisticated hardware and software tends to be lacking.

SUMMARY

It is, therefore, one aspect of the present disclosure to provide a system and process directed toward altering a two-dimensional video for three-dimensional viewing. Some embodiments relate to the reception of a two-dimensional video, an automatic conversion process, and the output of a three-dimensional video. Some embodiments relate to a conversion of live two-dimensional video into three-dimensional video for real-time display. Additional exemplary embodiments of the system relate to the conversion of two-dimensional video to three-dimensional video prior to distribution.

An exemplary embodiment of this disclosure relates to systems and methods for converting a two-dimensional video to a stereoscopic video for a three-dimensional display.

For example, the ability to convert 2D video to 3D video can be conducted using a virtual reality (VR) headset, or wearable viewing device, and a specified process. This process involves two side-by-side screens, or viewing areas, that can be viewed in a VR headset as one individual screen or viewing area. In embodiments of the process, both of the side-by-screens (Screen1 & Screen2) may consist of the same video feed and may play at the same rate. In some instances, such as wearable glasses, the screens may not be exactly side-by-side, but may comprise a right eye viewing area and left eye viewing area. However, one screen, or viewing area, may play having a specified, or predetermined, time delay. This time delay may vary based on the video source. For example, slow motion videos may require a greater time delay. The process may create 3D video, or video with visible depth, as well as a 3D image (if video is paused) regardless of the screen (right or left) delayed.

Accordingly, the conversion process may be used to create a 3D video from an online 2D video source, a standard 2D video source, and/or a streamed 2D video source. The conversion process may also be used for videogames to create a 3D gameplay experience. Embodiments of the present disclosure may utilize this conversion process to create a 3D image from a 2D video source, or from two 2D images taken from separate points of view. Moreover, the embodiments implementing such a conversion process may be used in either an application (e.g., App), or a specified website URL, in which the user may input the 2D source manually. Alternatively, or in addition, the conversion process may also be incorporated into third party applications giving the third party and/or user the ability to view a 2D video/game/image in 3D using this process.

While some of the embodiments outlined below are described in relation to the use of the stereoscopic as a three-dimensional video to be displayed in a virtual reality (VR) headset, it will be understood that the systems and methods described herein can apply equally to other types of stereoscopic displays, wherein two videos are displayed to a user, wherein each video is displayed specifically to a different eye of the user. Also, the conversion process may take place at any point between filming and displaying the video footage. The process can be used for any two-dimensional video. Thus, the following descriptions should not be seen to limit the system and methods described herein to any particular type of display system or any particular type of video.

The Summary is neither intended nor should it be construed as being representative of the full extent and scope of the present invention. The present invention is set forth in various levels of detail in the Summary, the attached drawings, and in the detailed description of the invention, and no limitation as to the scope of the present invention is intended by either the inclusion or non-inclusion of elements, components, etc. in the Summary. Additional aspects of the present invention will become more readily apparent from the detailed description, particularly when taken together with the drawings.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including, but not limited to, non-volatile media, volatile media, and transmission media. Non-volatile media includes, for example, NVRAM or magnetic or optical disks. Volatile media includes dynamic memory, such as main memory. Common forms of computer-readable media include, for example, a floppy disk, a flexible disk, hard disk, solid-state drive (SSD), magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine," "calculate," and "compute," and variations thereof, as used herein, are used interchangeably and include any type of methodology, process, mathematical operation or technique.

The term "module" as used herein refers to any known or later-developed hardware, software, firmware, artificial intelligence, fuzzy logic, or combination of hardware and software that is capable of performing the functionality associated with that element. Also, while the invention is described in terms of exemplary embodiments, it should be appreciated that an individual aspect of the invention can be separately claimed.

The term "video" can include video technology, inherently, and may also refer to motion imaging, or a sequence of images that when compiled together, create a video or moving sequence, or a digital recording of an image or set of images processed electronically into an analog or digital format and displayed on a screen in such a way to create the illusion of motion and continuity.

BRIEF DESCRIPTION OF THE DRAWINGS

For a more complete understanding of the present disclosure and its advantages, reference is now made to the following description taken in conjunction with the accompanying drawing, in which like reference numerals represent like parts:

FIG. 3 depicts an output display in accordance with at least one embodiment of the present disclosure;

FIG. 7 depicts a second flow chart illustrating a second conversion process in accordance with at least one embodiment of the present disclosure;

FIGS. 12A-C illustrate screen shots of a video sequence with an overlay; and

DESCRIPTION

Figure 1:
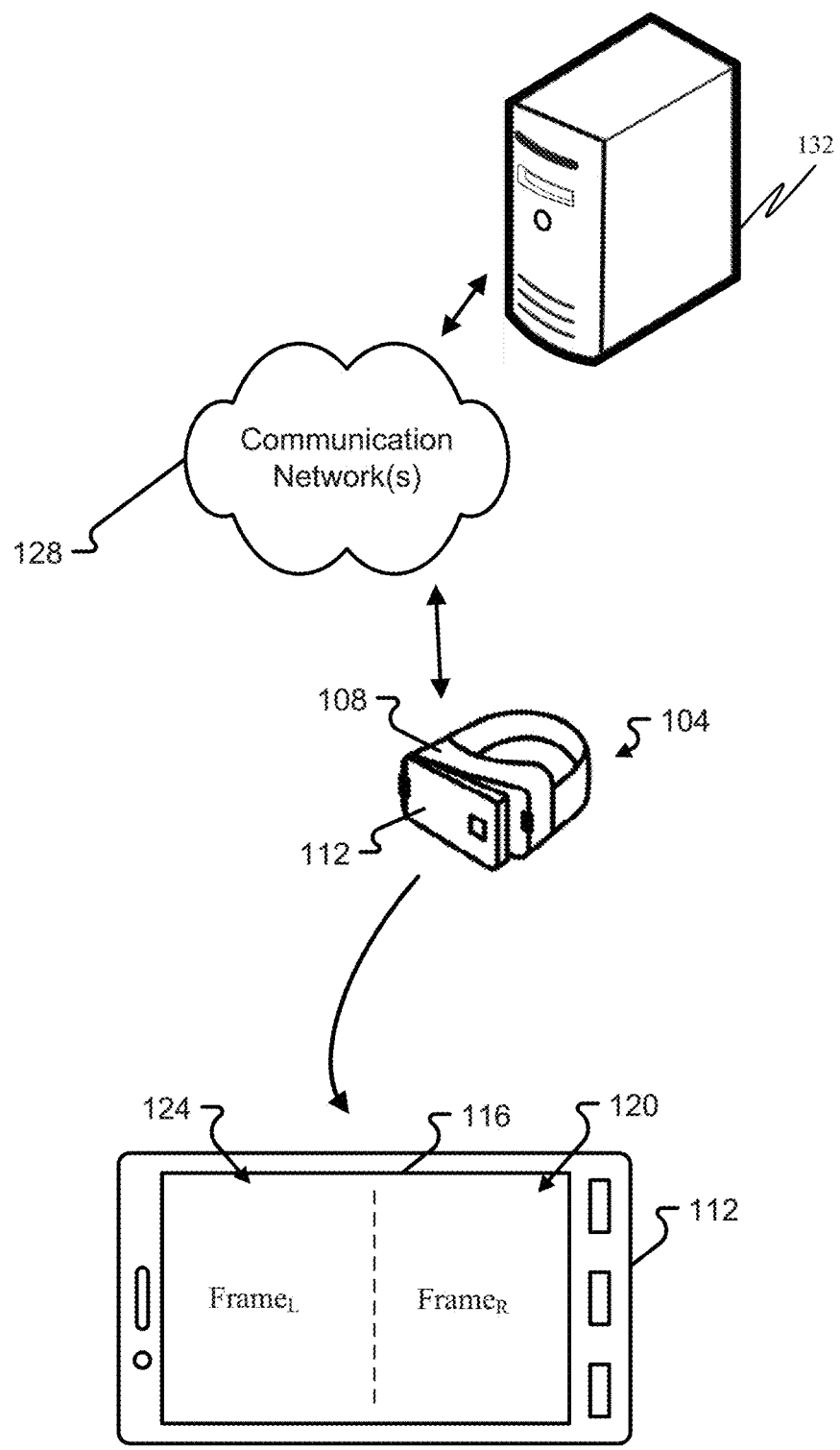
FIG. 1 illustrates a system implementing one or more processes that convert two-dimensional content into three-dimensional content for viewing in a virtual-reality headset in accordance with at least one embodiment of the present disclosure.

The ensuing description provides embodiments only and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

In accordance with some embodiments of the present disclosure, a two-dimensional video is input into a conversion system. The video is divided, or copied, into a left video and a right video. The left video and right video are the same or similar videos. One of the left or right video is delayed by a time delay. The left and right video are then displayed in a stereoscopic display such as a virtual-reality headset.

The conversion process may take place immediately following or coinciding with the recording of the video. Alternatively, or in addition, a two-dimensional video is received by a user stereoscopic display device before being converted into a video for three-dimensional display and then displayed in the user stereoscopic display device. The two-dimensional video may be streamed from the Internet, uploaded into, or otherwise provided to the system.

This conversion process can be used to create a video for three-dimensional display from any 2D video source, including an online video source, streamable from an internet website, transferred via the internet, stored on a hard drive or other storage medium. The 2D video may also be in high-definition, and may also be a virtual-reality video. The 2D video source may also be a live video stream. The 2D video source may also be live streamed from a camera. The process may also be used by a video game system to create a 3D gameplay experience. The process may also be used to create a 3D still image from a 2D video source. Instead of a video source, the source may also be two separate images and/or two motion images.

The conversion system may automatically determine whether to delay the left video or the right video based on metadata stored in the video file, a user input, or active video analysis. In general, if the camera in the video is panning to the left, the delay may be performed on the right video, such that the video displayed to the right eye of the user is slightly behind in time in relation to the video displayed to the left eye. Similarly, if the camera in the video is panning to the right, the delay may be performed on the left video. Other factors, other than the camera movement, may be used in determining which video to delay. In some situations, the delayed video may switch between the left and the right video.

The conversion system may automatically determine the amount of time delay to be used in the delay of the left or right video. This determination may be made based on metadata stored in the video file, a user input, or active video analysis. In general, if the camera in the video is moving quickly, the time delay may be shorter, while if the camera in the video is moving slowly, the time delay may be longer. Other factors may be used in determining the time delay. The time delay may be a constant amount or varied depending on the situation and/or other factors.

In accordance with some embodiments of the present disclosure, a time delay of 0.1 seconds may be used. For example, the left display may be the delayed video display. The right display will begin displaying the right display video and the left display will begin displaying the left display video 0.1 seconds later. In another embodiment, wherein the right display is the delayed video display, the left display will begin displaying the left display video and the right display will begin displaying the right display video 0.1 seconds later. Of course, the time delay may be less than 0.1 seconds or greater than 0.1 seconds.

In accordance with some embodiments of the present disclosure, any stereoscopic display may be used to display the stereoscopic output video of the system. For instance, the left and right videos may be displayed on a common screen used in conjunction with a VR headset such as Google Cardboard™. The left and right videos may be displayed using a polarization system, autostereoscopy display, or any other stereoscopic display system. The converted video may be live-streamed by a display device, or saved into memory as a converted, stereoscopic video file, wherein the stereoscopic video file may be viewed at a later time by a stereoscopic display without a need for additional conversion.

In accordance with some embodiments of the present disclosure, the system may also be used to create still images appearing in three dimensions from a two-dimensional video and/or motion imaging.

Referring initially to FIG. 1, a system implementing one or more processes that convert two-dimensional content into three-dimensional content for viewing in a virtual-reality headset is depicted in accordance with at least one embodiment of the present disclosure. The display system 104 may include a VR viewer 108 and a mobile device 112. The mobile device 112 may be configured to be attached to or otherwise coupled to the viewer 108. Alternatively, or in addition, the viewer 108 may be configured to receive the mobile device 112. Examples of the viewer 108 may include, but are not limited to, Oculus Rift™, HTC Vive™, Sony Playstation VR™, Samsung Gear VR™, Google Daydream View™, Google Cardboard™, Huawaei VR Headset™, LG 360 VR™, Homido™, Microsoft HoloLens™, and the Sulon Q™. The system may also be used on other current viewing devices and future variations thereof to include, but not limited to, Google Glass™, and Snapchat Spectacles™. As further depicted in FIG. 1, the mobile device 112 may include a display 116. The display 116 may include a first viewing area 120 and a second viewing area 124. The first viewing area 120 may display content, such as a frame of video, to be viewed by a right eye of a user while the second viewing area 124 may display content, such as a frame of video, to be viewed by a left eye of a user. Alternatively, the first viewing area 120 may display content, such as a frame of video, to be viewed by a left eye of a user while the second viewing area 124 may display content, such as a frame of video, to be viewed by a right eye of a user.

Two-dimensional content to be displayed utilizing the display system 104 may be provided by one or more content providers 132. Accordingly, the two-dimensional content may be streamed from the one or more content providers 132 to the display system 104, more specifically, the mobile device 112, across one or more communication networks 128. The one or more communication networks 128 may comprise any type of known communication medium or collection of communication media and may use any type of known protocols to transport content between endpoints. The communication network 128 is generally a wireless communication network employing one or more wireless communication technologies; however, the communication network 128 may include one or more wired components and may implement one or more wired communication technologies. The Internet is an example of the communication network 128 that constitutes an Internet Protocol (IP) network consisting of many computers, computing networks, and other communication devices located all over the world, which are connected through many networked systems and other means. Other examples of components that may be utilized within the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 128 need not be limited to any one network type, and instead may be comprised of a number of different networks and/or network types. The communication network 128 may further comprise, without limitation, one or more Bluetooth networks implementing one or more current or future Bluetooth standards, one or more device-to-device Bluetooth connections implementing one or more current or future Bluetooth standards, wireless local area networks implementing one or more 802.11 standards, such as and not limited to 802.11a, 802.11b, 802.11c, 802.11g, 802.11n, 802.11ac, 802.11as, and 802.11v standards, and/or one or more device-to-device Wi-Fi-direct connections.

Figure 2:
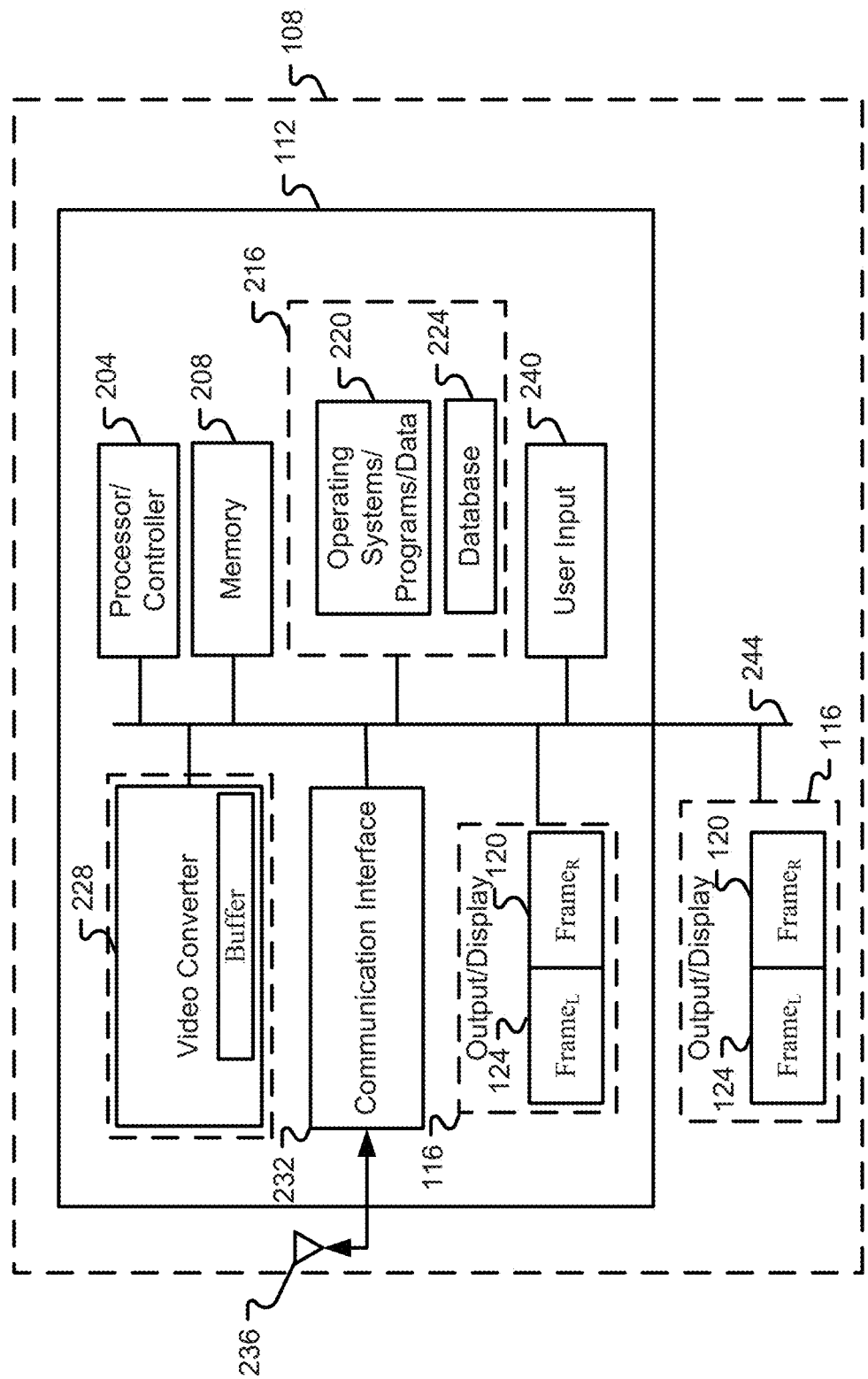
FIG. 2 illustrates a block diagram of one or more 2D-3D converter in accordance with at least one embodiment of the present disclosure.

FIG. 2 illustrates additional details of one or more mobile devices 112 and the viewer 108 in accordance with embodiments of the present disclosure. Alternatively, or in addition, the viewer 108 may include a 2D-3D converter that performs the same or similar functions as the mobile device 112. That is, the 2D-3D converter may be included in a computing/mobile device, such as, but not limited to, a smartphone, smartpad, laptop, or other computing device. The mobile device 112 may include a processor/controller 204, memory 208, storage 216, user input 240, an output/display 116, a communication interface 232, antenna 236, a video converter 228, and a system bus 244. The processor/controller 204 may be implemented as any suitable type of microprocessor or similar type of processing chip, such as any general-purpose programmable processor, digital signal processor (DSP) or controller for executing application programming contained within memory 208. Alternatively, or in addition, the processor 204 and memory 208 may be replaced or augmented with an application specific integrated circuit (ASIC), a programmable logic device (PLD), or a field programmable gate array (FPGA).

The memory 208 generally comprises software routines facilitating, in operation, pre-determined functionality of the mobile device 112. The memory 208 may be implemented using various types of electronic memory generally including at least one array of non-volatile memory cells (e.g., Erasable Programmable Read Only Memory (EPROM) cells or flash memory cells, etc.). The memory 208 may also include at least one array of Dynamic Random Access Memory (DRAM) cells. The content of the DRAM cells may be pre-programmed and write-protected thereafter, whereas other portions of the memory 208 may be selectively modified or erased. The memory 208 may be used for either permanent data storage or temporary data storage.

Alternatively, or in addition, data storage 216 may be provided. The data storage 216 may generally include storage for programs and data. For instance, with respect to the mobile device 112, data storage 216 may provide storage for a database 224. Data storage 216 associated with the mobile device 112 may also provide storage for operating system software, programs, and program data 220.

The communication interface 232 may comprise a Wi-Fi, BLUETOOTH™, WiMAX, infrared, NFC, and/or other wireless communications links. The communication interface 232 may include a processor and memory; alternatively, or in addition, the communication interface 232 may share the processor 204 and memory 208 of the mobile device 112. The communication interface 232 may be associated with one or more shared or dedicated antennas 236. The communication interface 232 may additionally include one or more multimedia interfaces for receiving multimedia content. Alternatively, or in addition, the mobile device 112 may receive multimedia content from one or more devices utilizing a communication network, such as, but not limited to, a mobile device and/or a multimedia content provider.

In addition, the mobile device 112 may include one or more user input devices 240, such as a keyboard, a pointing device, a remote control, and/or a manual adjustment mechanism. Alternatively, or in addition, the mobile device 112 may include one or more output/display devices 116, such as, but not limited to, an LCD, an OLED, or an LED type display. Alternatively, or in addition, the output/display 116 may be separate from the mobile device 112; for example, left and right video content may be displayed on a common screen 116 used in conjunction with a VR headset such as one or more of the previously listed VR headsets.

FIG. 3 illustrates a display device 312 in accordance with embodiments of the present disclosure. The display device 312 may be the same as or similar to the display 116 as previously described and thus, the description of display 116 applies equally to display device 312. As can be appreciated, a first display area 304 is presented alongside and adjacent to a second display area 308 in a common screen or otherwise. The first display area 304 may be presented to a first eye of a user, while the second display area 308 may be presented to a second eye of the user.

As the locations of the first display area 304 and the second display area 308 are not dependent on multiple physically separable displays or screens, the location of each display area may be adjusted based on information, such as calibration information, provided by a user. That is, a user may utilize the user input 240 to adjust a location of the display areas 304 and 308, separately or together. For example, display area 304B and 308B may be adjusted based on $\Delta X_1$ and $\Delta Y_1$. Accordingly, each of the display area 304B and 308B may be offset from a center located 304A and 304B based on $\Delta X_1$ and $\Delta Y_1$. Alternatively, or in addition, each of the display area, such as 304C and 308C, may be separately located. For example, first display area 304C may be offset or otherwise adjusted based on $\Delta FDA\text{-}X_2$ and $\Delta FDA\text{-}Y_2$; while second display area 308C may be offset or otherwise adjusted based on $\Delta SDA\text{-}X_3$ and $\Delta SDA\text{-}Y_3$, where $\Delta FDA\text{-}X_2$ may be different from $\Delta SDA\text{-}X_3$ and $\Delta FDA\text{-}Y_2$ may be different from $\Delta SDA\text{-}Y_3$. Thus, the location of the first display area and the second may vary such that the display device 312 can be used with varying VR display devices as previously discussed.

As further depicted in FIG. 3, one or more video sequences may be delayed in accordance with embodiments of the present disclosure. That is, a video sequence associated with the first display area 304 may start at a first start time, while a video sequence associated with the second display 308 area may be delayed by 0.1 seconds. Alternatively, a video sequence associated with the second display area 308 may start at a first start time, while a video sequence associated with the first display 304 area may be delayed by 0.1 seconds.

Figure 4A:
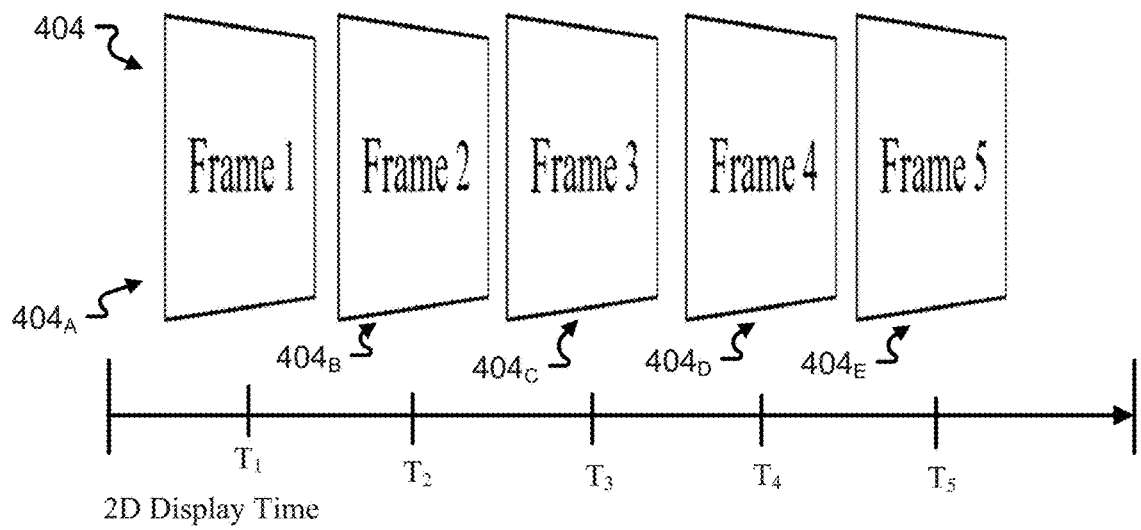
FIGS. 4A-4B depict an input video sequence including multiple frames and two video sequences for display at a three-dimensional viewing device in accordance with at least one embodiment of the present disclosure.
Figure 4B:
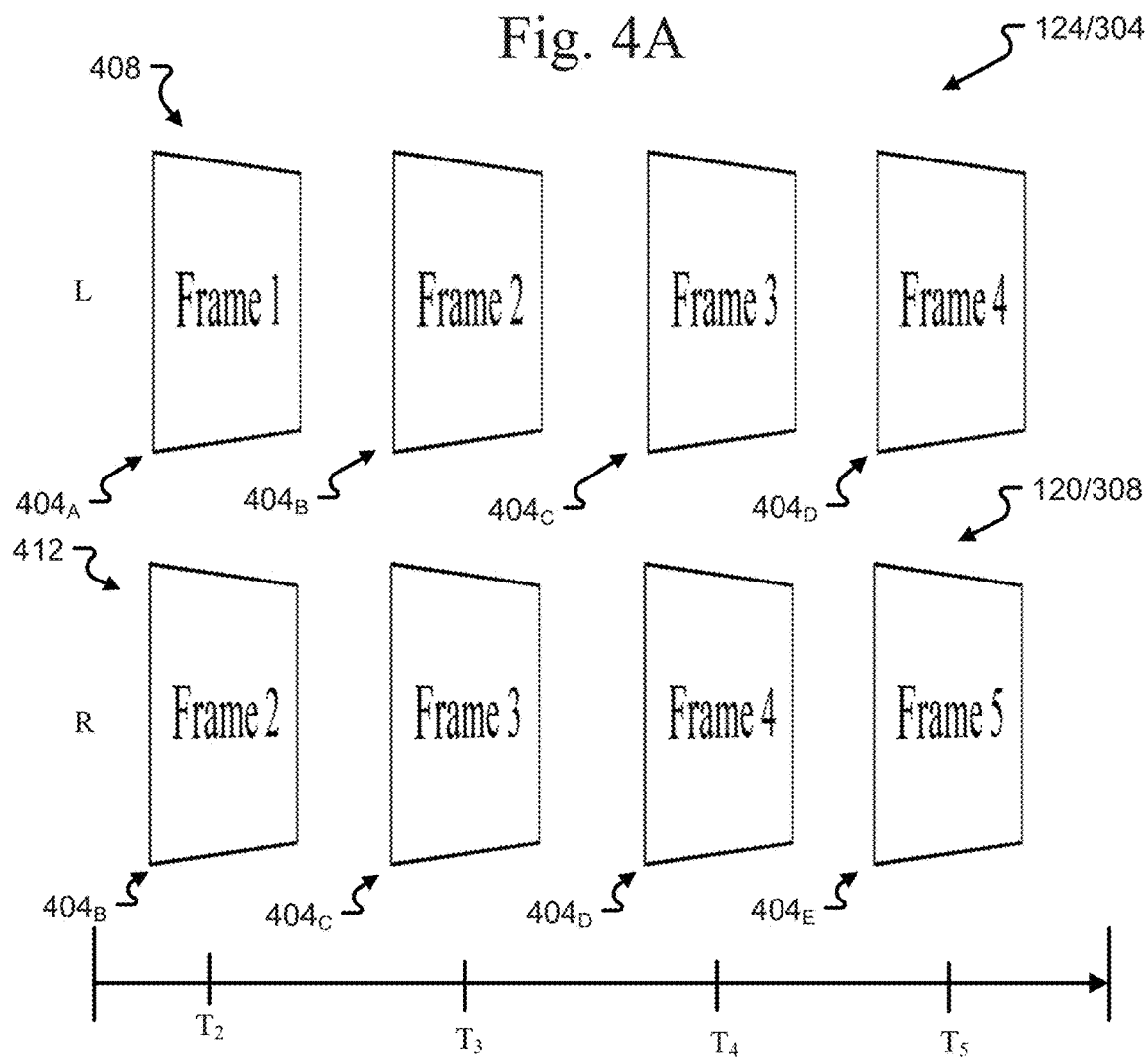

As further depicted in with respect to FIG. 4A, a first standard two-dimensional video sequence 404 may include video frames $404_A$-$404_E$, wherein each frame is an electronically coded still image. The first video sequence 404 may be stored in one or more of the memory 208 and/or storage 216. Alternatively, or in addition, the first video sequence 404 may be received at the communication interface 232. The first frame $404_A$ may be displayed at a first time $T_1$, the second frame $404_B$ may be displayed at a second time $T_2$, the third frame $404_C$ may be displayed at a third time $T_3$, the fourth frame $404_D$ may be displayed at a fourth time $T_4$, and the fifth frame $404_E$ may be displayed at a fifth time $T_2$. Of course, the first video sequence 404 may include more or less frames, and the sequence depicted may be located anywhere, such as the start, middle, or end, of the video sequence. As depicted in FIG. 4B, the first video sequence 404 may be split into two streams, a first video sequence for 3D display 408 and a second video sequence for 3D display 412. As illustrated in FIG. 4B, the first video sequence for 3D display 408 may be delayed by one frame such that different frames of video are displayed to each of the first viewing area 120/308 and second viewing area 124/304. Accordingly, at a time equal to $T_2$ for example, frame $404_B$ may be displayed at the first viewing area 120/308 while frame $404_A$ may be displayed at the second viewing area 124/304. Although the first video sequence for 3D display 408 is illustrated as being delayed by a single frame, it should be understood that one or more of the first video sequence for 3D display 408 and/or second video sequence for 3D display 412 may be delayed by more or less frames. For example, an amount of delay may be based on a fraction of a framerate. For instance, if a framerate is 30 frames per second, one or more of the first video sequence for 3D display 408 and/or the second video sequence for 3D display 412 may be delayed by 0.1 seconds, or 3 frames.

Figure 5:
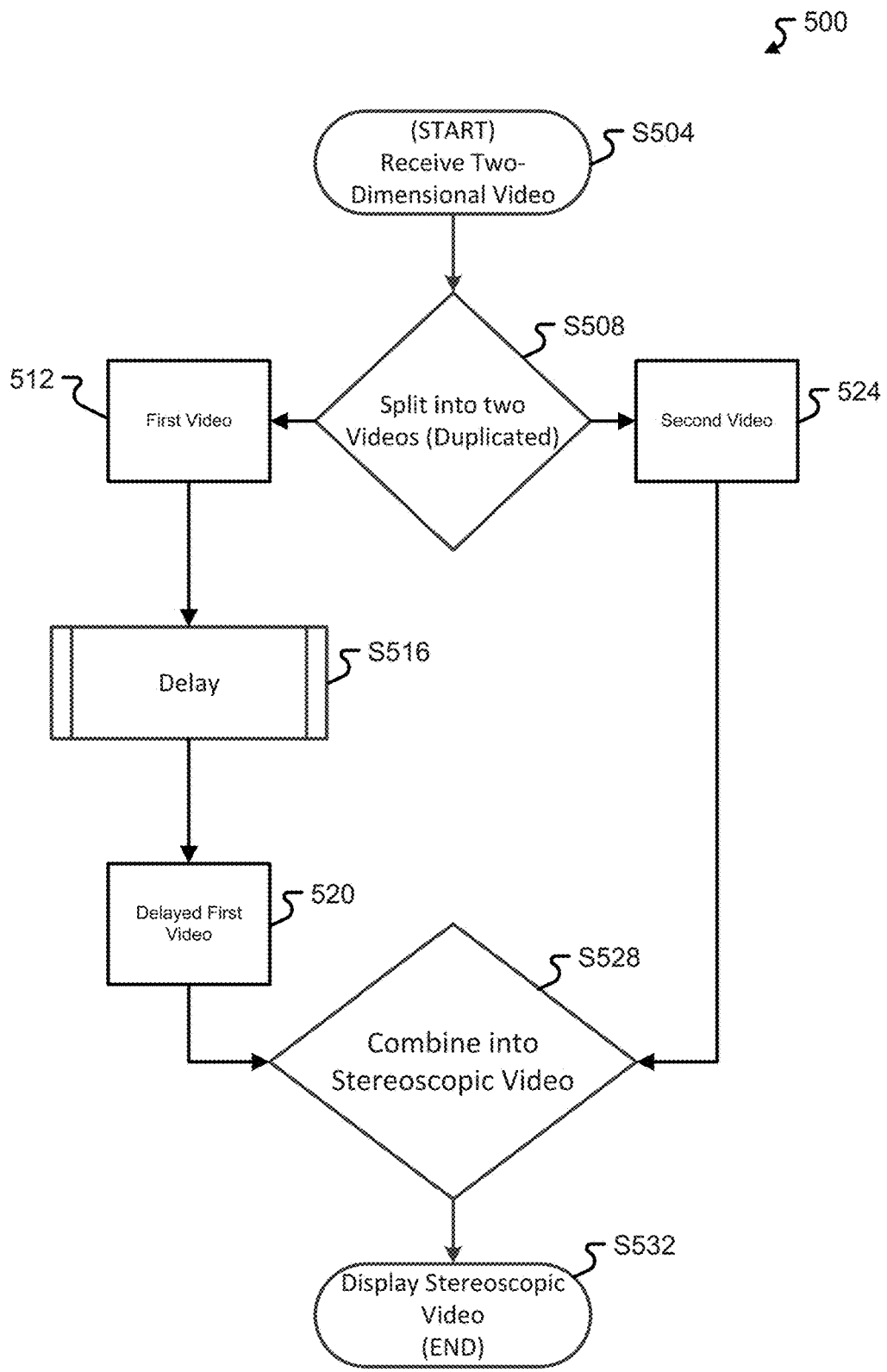
FIG. 5 depicts a first flow chart illustrating a conversion process in accordance with at least one embodiment of the present disclosure.

Referring now to FIG. 5, a method 500 illustrating a 2D-3D conversion process in accordance with embodiments of the present disclosure is provided. The method 500 is in embodiments, performed by one or more devices, such as the mobile device 112. More specifically, one or more hardware and software components may be involved in performing method 500. In one embodiment, one or more of the previously described devices perform one or more of the steps of the method 500. The method 500 may be executed as a set of computer-executable instructions executed by the mobile device 112. Hereinafter, the method 500 shall be explained with reference to systems, components, units, software, etc. described with respect to FIGS. 1-4B.

Method 500 may continuously flow in a loop, flow according to a timed event, or flow according to a change in an operating or status parameter. Method 500 may be initiated at step S504 where a two-dimensional video sequence may be received. The two-dimensional video sequence may be the same as or similar to the two-dimensional (2D) video sequence first video sequence 404 as previously described. As discussed above, this 2D video source may be one of any number of 2D video sources. Such video may be stored in the memory 208 and/or other storage 216. The 2D video may then be split or otherwise duplicated by the video converter into a first and second video stream at step S508. Alternatively, or in addition, the video sequence may be split by a dedicated video splitter, such as a video converter 228 or otherwise duplicated to create first and second video streams 512 and 524. One of the first or second video streams is then delayed, by a buffer for example, in accordance with a determined time delay at step S516. Such time delay may be provided by the user input 240 or otherwise received from the storage/memory 208 and/or storage 216. Moreover, the buffer may be implemented in hardware, such as memory 208 and/or may be included in the video converter 228. For example, the buffer may be a first in first out (FIFO) buffer such that each frame of video is delayed by an amount of time corresponding to a length, or size, of the FIFO buffer. As a video delay requirement is increased or decreased, the FIFO buffer may increase and/or decrease in length, or size, according to such video delay requirement in order to create a delayed video 520. Alternatively, or in addition, a presentation timestamp associated with one or more of the first and second video streams 512 and 524 may be altered to achieve a determined delay. Frames may also be organized such that any given frame may be directed to one eye or both eyes at any given time. Finally, the first and second video streams 512 and 524 are output together in a format to be used in conjunction with a stereoscopic display. As one example, the first and second video streams may be combined at step S528 into a single video stream prior to being output to a display. Alternatively, or in addition, the first and second video streams may be output as individual video streams. At step S532, the first and second video streams 512 and 524 may be displayed to the first viewing area 120 and/or the second viewing area 124.

Alternatively, or in addition, a 2D video may be stored or otherwise accessible via a server configured to provide one or more videos. Such server may make a video available via a URL and may incorporate a delay value within the URL.

Figure 6A:
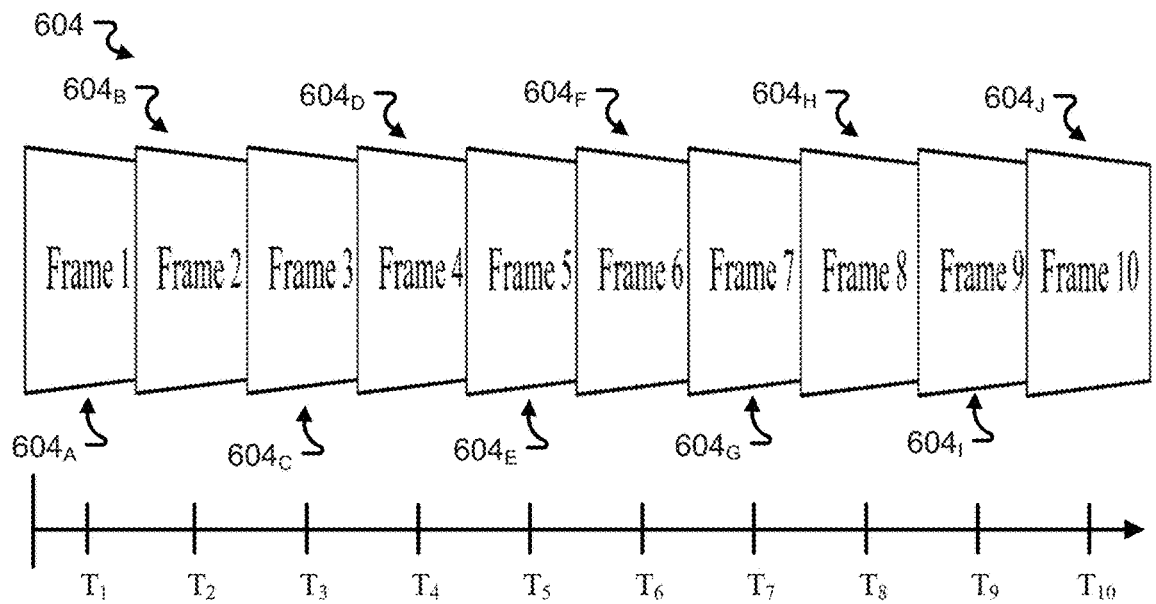
FIGS. 6A-6B depict a second input video sequence including multiple frames and two video sequences for display at a three-dimensional viewing device in accordance with at least one embodiment of the present disclosure.
Figure 6B:
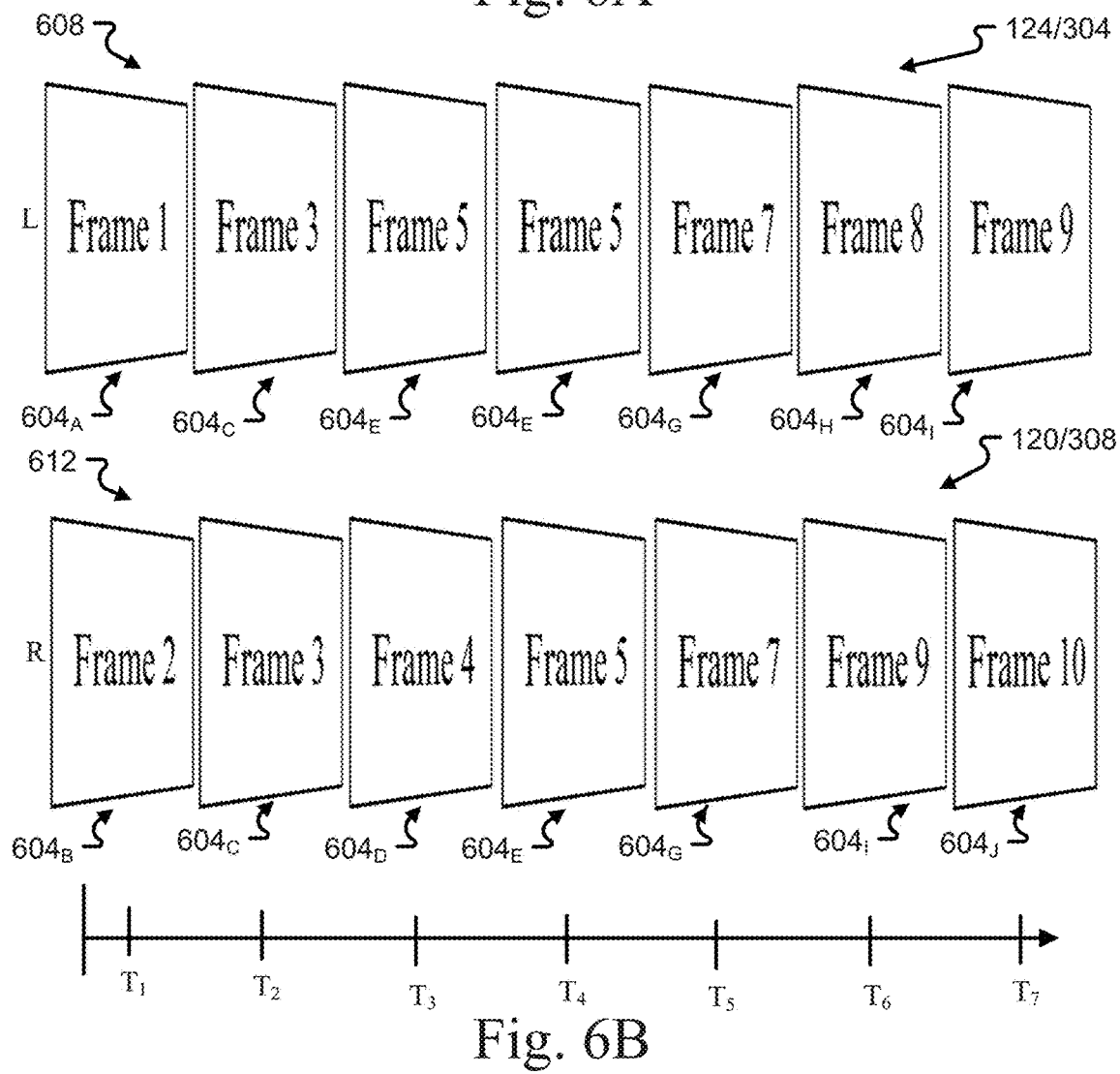

FIG. 6A depicts details of a second input video sequence including multiple frames and two video sequences for display at a three-dimensional viewing device in accordance with at least one embodiment of the present disclosure. Similar to FIG. 4A, FIG. 6A depicts a first standard two-dimensional video sequence 604 that may include video frames $604_A$-$604_4$ wherein each frame is an electronically coded still image. The first video sequence 604 may be stored in one or more of the memory 208 and/or storage 216 and/or in the cloud via the communications network 128. Alternatively, or in addition, the first video sequence 604 may be received at the communication interface 232. The first frame $604_A$ may be displayed at a first time $T_1$, the second frame $604_B$ may be displayed at a second time $T_2$, the third frame $604_C$ may be displayed at a third time $T_3$, and so on. Of course, the first video sequence 604 may include more or less frames, and the sequence depicted may be located anywhere, such as the start, middle, or end, of the video sequence. As depicted in FIG. 6B, the first video sequence 604 may be split into two streams, a first video sequence for 3D display 608 and a second video sequence for 3D display 612. As illustrated in FIG. 6B, the first video sequence for 3D display 608 may include video frames and frame sequences that are different from the second video sequence for 3D display 612. That is, in addition to being delayed by one or more frames and/or one or more periods of time, different frames of video are displayed to each of the first viewing area 120/308 and second viewing area 124/304 based on the different sequences. In some instances, a same frame of video may be displayed to both the first viewing area 120/308 and second viewing area 124/304. Accordingly, at a time equal to $T_2$ for example, frame $604_C$ may be displayed at the first viewing area 120/308 and at the second viewing area 124/304. Although the first video sequence for 3D display 608 is illustrated as being delayed by a single frame, it should be understood that one or more of the first video sequence for 3D display 608 and/or second video sequence for 3D display 612 may be delayed by more or less frames. Alternatively, or in addition, one or more video frames may not be displayed in a particular video sequence. Thus, individual frames from the first video sequence 604 may be detected and may be reorganized between first viewing area 120 and second viewing area 124 to minimize blur to human eye(s) and/or to reduce inefficiency in viewing. Thus, a reorganization of various input frames can be used to create a 3D effect and/or to enhance the viewing performance and quality. Thus, the composition of the video sequences 608 and/or 612 may vary depending on several factors including, but not limited to, pixel changes between frames, rate of change between pixels, color change between pixels, and/or visual performance characteristics. Thus, frames can be added and/or removed from sequences.

Moreover, the first viewing area 120 and the second viewing area 124 may have the same frame at any given time; alternatively, the first viewing area 120 and the second viewing area 124 may have a different frame at any given time. As previously discussed, one or more frames may be removed from one or more of the video sequences 608 and/or 612. An example of reorganizing frames may be depicted in FIG. 6B. Other reorganized video sequences may include sequences arranged in accordance with Table 1.

TABLE 1

EXAMPLE 1: (F = Frame)
First video sequence for 3D display 608 - sequence: F1, F2, F3
first video sequence for 3D display 612 - sequence: F1, F3, F4
EXAMPLE 2: (F = Frame)
First video sequence for 3D display 608 - sequence: F1, F3, F5
first video sequence for 3D display 612 - sequence: F2, F4, F6
EXAMPLE 3: (F = Frame)
First video sequence for 3D display 608 - sequence: F1, F3, F4
first video sequence for 3D display 612 - sequence: F3, F4, F5
EXAMPLE 4: (F = Frame)
First video sequence for 3D display 608 - sequence: F1, F3, F4
first video sequence for 3D display 612 - sequence: F2, F3, F4
EXAMPLE 5: (F = Frame)
First video sequence for 3D display 608 - sequence: F1, F3, F4
first video sequence for 3D display 612 - sequence: F2, F4, F5
EXAMPLE 6: (F = Frame)
First video sequence for 3D display 608 - sequence: F1, F5, F6
first video sequence for 3D display 612 - sequence: F2, F3, F4

Thus, the video frames with the video sequences may be thought of as a deck of cards, where some cards may be removed from the deck (some frames may be removed), the same card (frame) can be dealt twice at the same time, and/or the same card (frame) can be dealt twice at different times.

Referring now to FIG. 7, and as previously discussed, the composition of the video sequences 608 and/or 612 may vary depending on several factors including, but not limited to, pixel changes between frames, rate of change between pixels, color change between pixels and/or visual performance characteristics. As depicted in FIG. 7, a degree and/or magnitude of change associated with a single pixel and/or multiple pixels between a first frame 704A of a video sequence and a second frame 704B of the video sequence may determine an amount of delay between the video sequences 608 and/or 612 and/or whether one or more frames are removed and/or reorganized. Alternatively, or in addition, a number pixels, or group of pixels, that change between a first frame 708A and a second frame 708B may determine an amount of delay between the video sequences 608 and/or 612 and/or whether one or more frames are removed and/or reorganized. Such amount may be for an entire frame and/or a specific area or region with in a frame.

Figure 8:
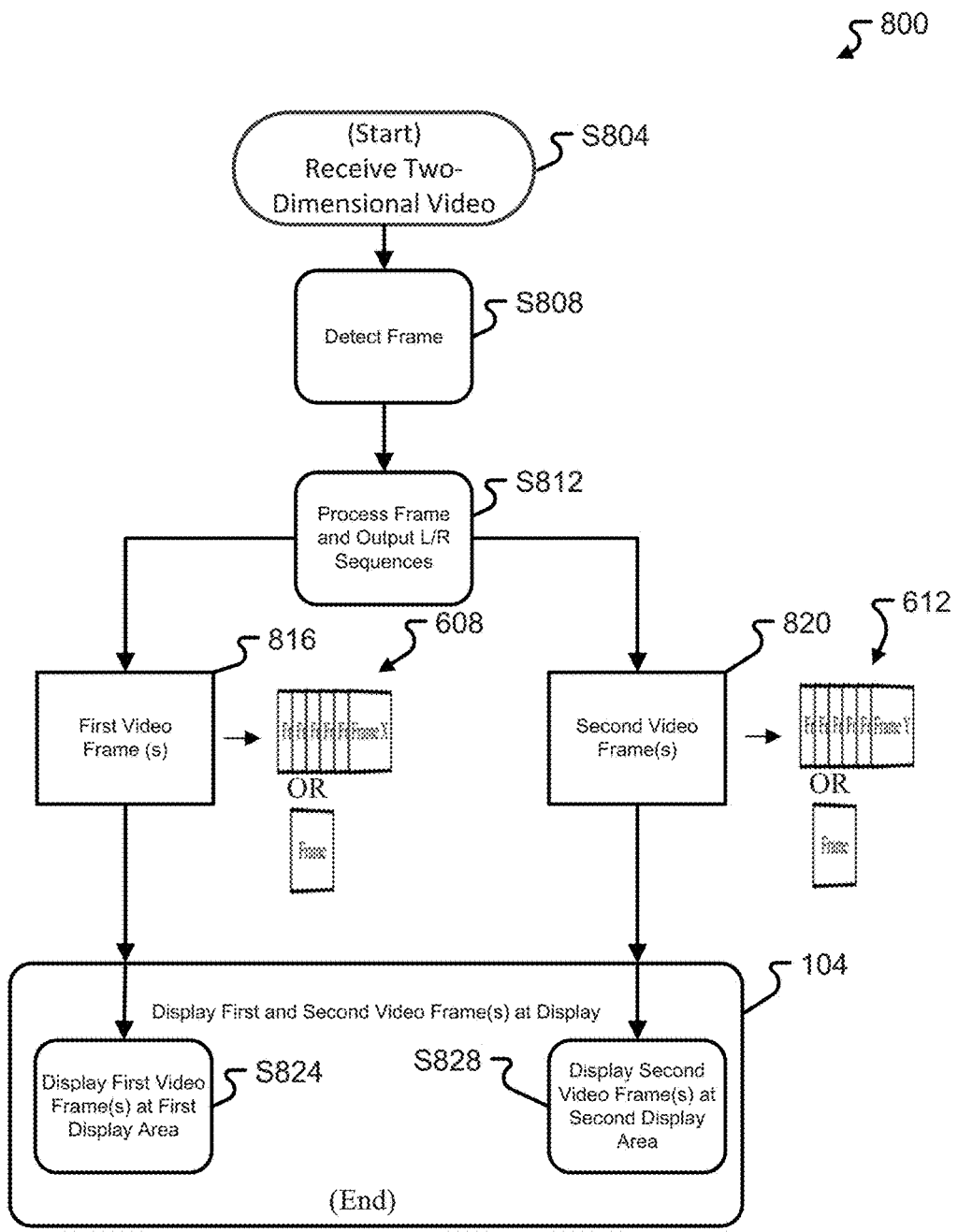
FIG. 8 depicts additional details directed to pixel/block/macroblock movement-based determinations in accordance with at least one aspect of the present disclosure.

Referring now to FIG. 8, a method 800 illustrating a 2D-3D conversion process in accordance with embodiments of the present disclosure is provided. The method 800 is in embodiments, performed by one or more devices, such as the mobile device 112. More specifically, one or more hardware and software components may be involved in performing method 800. In one embodiment, one or more of the previously described devices perform one or more of the steps of the method 800. The method 800 may be executed as a set of computer-executable instructions executed by the mobile device 112. Hereinafter, the method 800 shall be explained with reference to systems, components, units, software, etc. described with respect to FIGS. 1-7.

Method 800 may continuously flow in a loop, flow according to a timed event, or flow according to a change in an operating or status parameter. Method 800 may be initiated at step S804 where a two-dimensional video sequence may be received. The two-dimensional video sequence may be the same as or similar to the two-dimensional (2D) video sequence first video sequence 604 as previously described. As discussed above, this 2D video source may be one of any number of 2D video sources. Such video may be stored in the memory 208 and/or other storage 216, such as offline or cloud storage. At step S808, a frame may be detected within the received video sequence. Upon detection of a frame, one or more characteristics of the frame cause one or more frames within the video sequence to be reorganized and/or removed. Thus, one or more of the detected frames may be processed at step S812 where the frame may be duplicated for display to the first viewing area 120 and/or second viewing area 124. Accordingly, frames for each of the video sequences (e.g., 608 and 612) may be accumulated at 816 and/or 820. 816 and/or 820 may be representative of memory 208 and/or one or more buffers within the video converter 228. Thus, the video sequences 608 and/or 612 including multiple frames may be displayed at the first viewing area 120 and/or second viewing area 124 of the display 116 of the display system 104 at steps S824 and steps S828. Alternatively, or in addition, frames output from step S812 may be immediately displayed at the first viewing area 120 and/or second viewing area 124 of the display 116 of the display system 104 at steps S824 and steps S828. Accordingly, one frame for each first viewing area 120 and/or second viewing area 124 may be processed and displayed at a time. Alternatively, or in addition, a presentation timestamp associated with one or more of the first and second video streams 608 and 612 may be altered to achieve the desired display time for each frame.

As discussed with respect to FIG. 5, the first and second video streams 608 and 612 may be output together in a format to be used in conjunction with a stereoscopic display. As one example, the first and second video streams may be combined into a single video stream prior to being output to a display. Alternatively, or in addition, the first and second video streams may be output as individual video streams.

Figure 9:
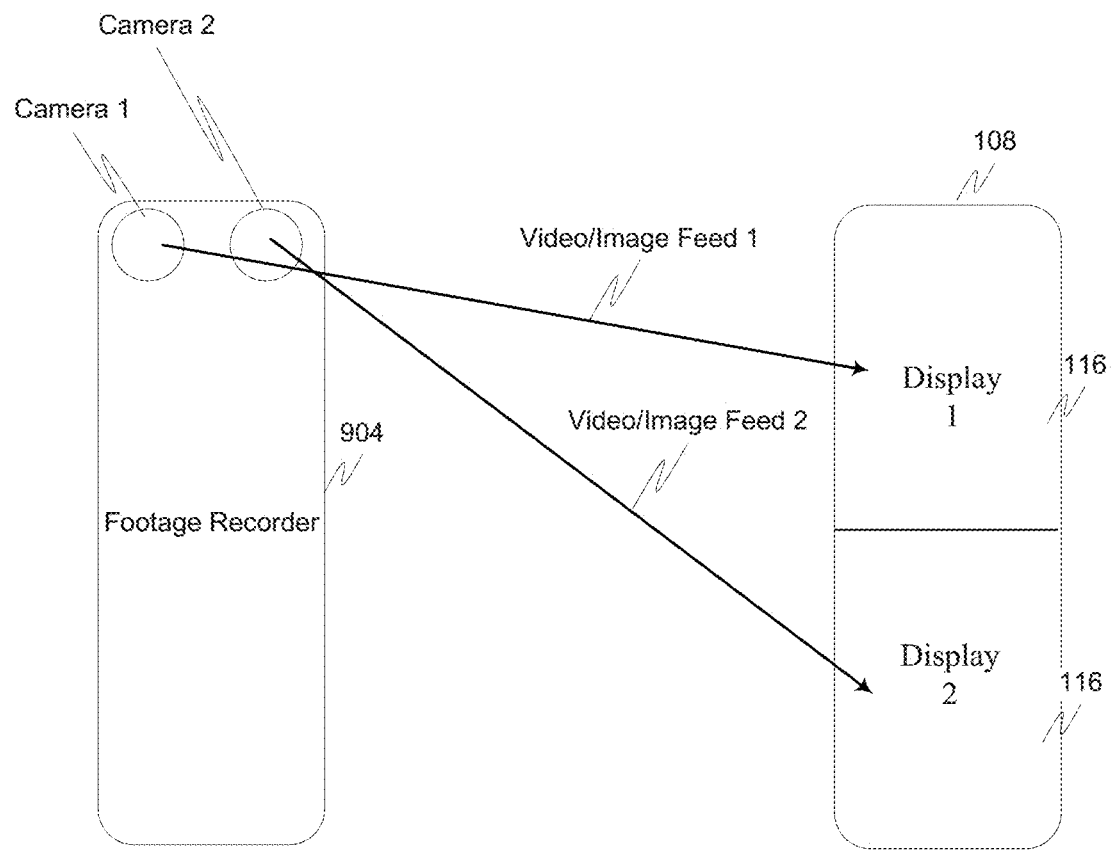
FIG. 9 illustrates another exemplary aspect of the viewer.

FIG. 9 illustrates another configuration of the viewer 108 with two displays 116. Here, the viewer 108, such as a smartphone, tabled, pad, etc, receives a first video/image feed from a first camera on a footage recorder 904 at a first display, and a second video/image feed from a second camera at a second display. The footage recorder can be any type of image/video recording device and includes one or more cameras, a processor, memory and storage. The two-dimensional video sequence from cameras one and two may be the same as or similar to the two-dimensional (2D) video sequence as previously described. One of the first or second video streams is then delayed, by a buffer for example, in accordance with a determined time delay as discussed. Such time delay may be provided by the user input or otherwise received from the storage/memory 208 and/or storage 216 as discussed. The video streams are then displayed on the viewer/device 108.

Figure 10:
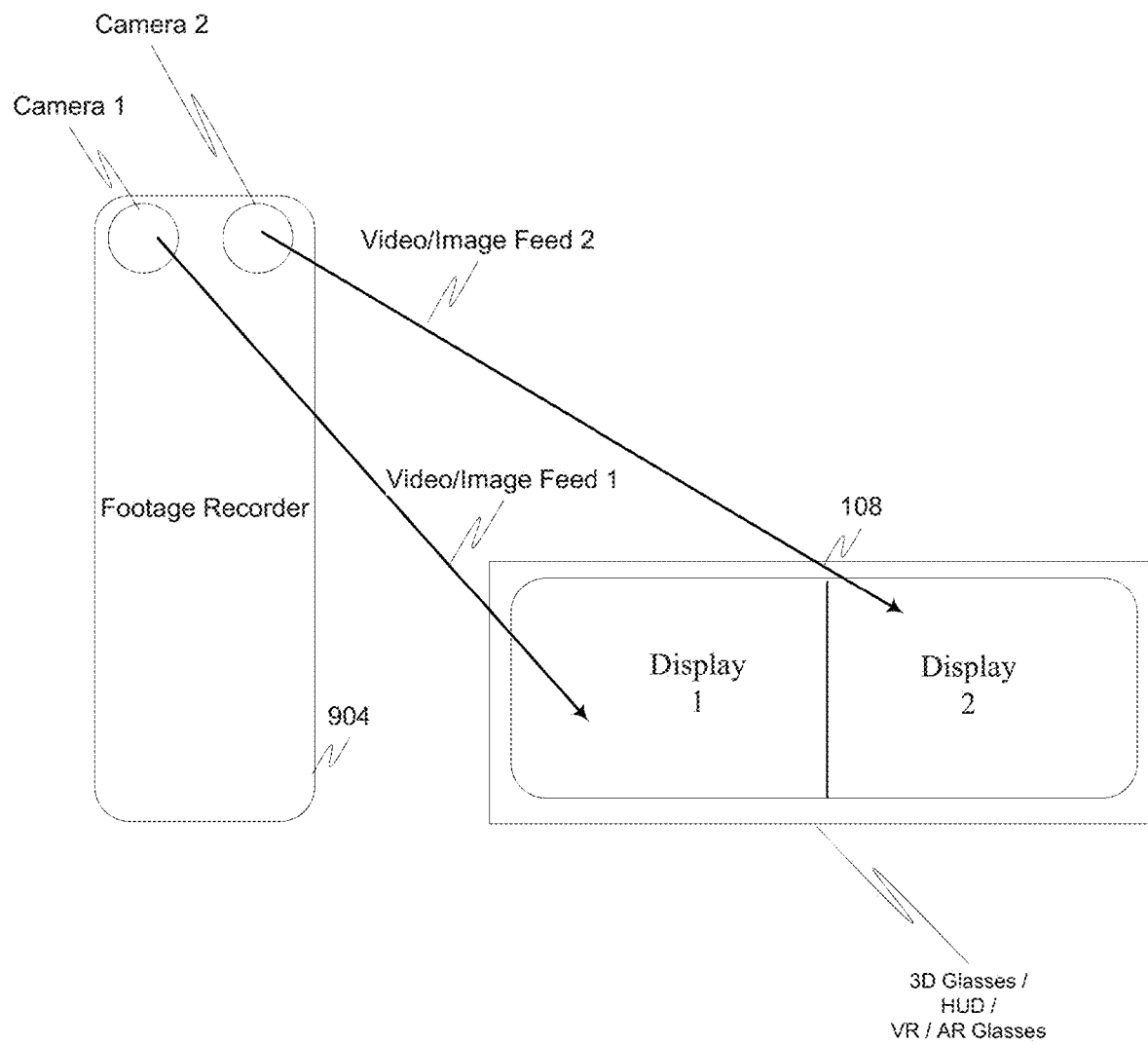
FIG. 10 illustrates yet another aspect of the viewer.

FIG. 10 illustrates another example of the viewer 108, where the viewer is a pair of 3D glasses, a heads-up display (HUD), a virtual/augmented reality glasses, or the like, and a first video/image feed from a first camera on a footage recorder 904 is received at a first display, and a second video/image feed from a second camera is received at a second display. The viewer 108 operates in the same manner as described herein with one of the first or second video streams being delayed.

Figure 11:
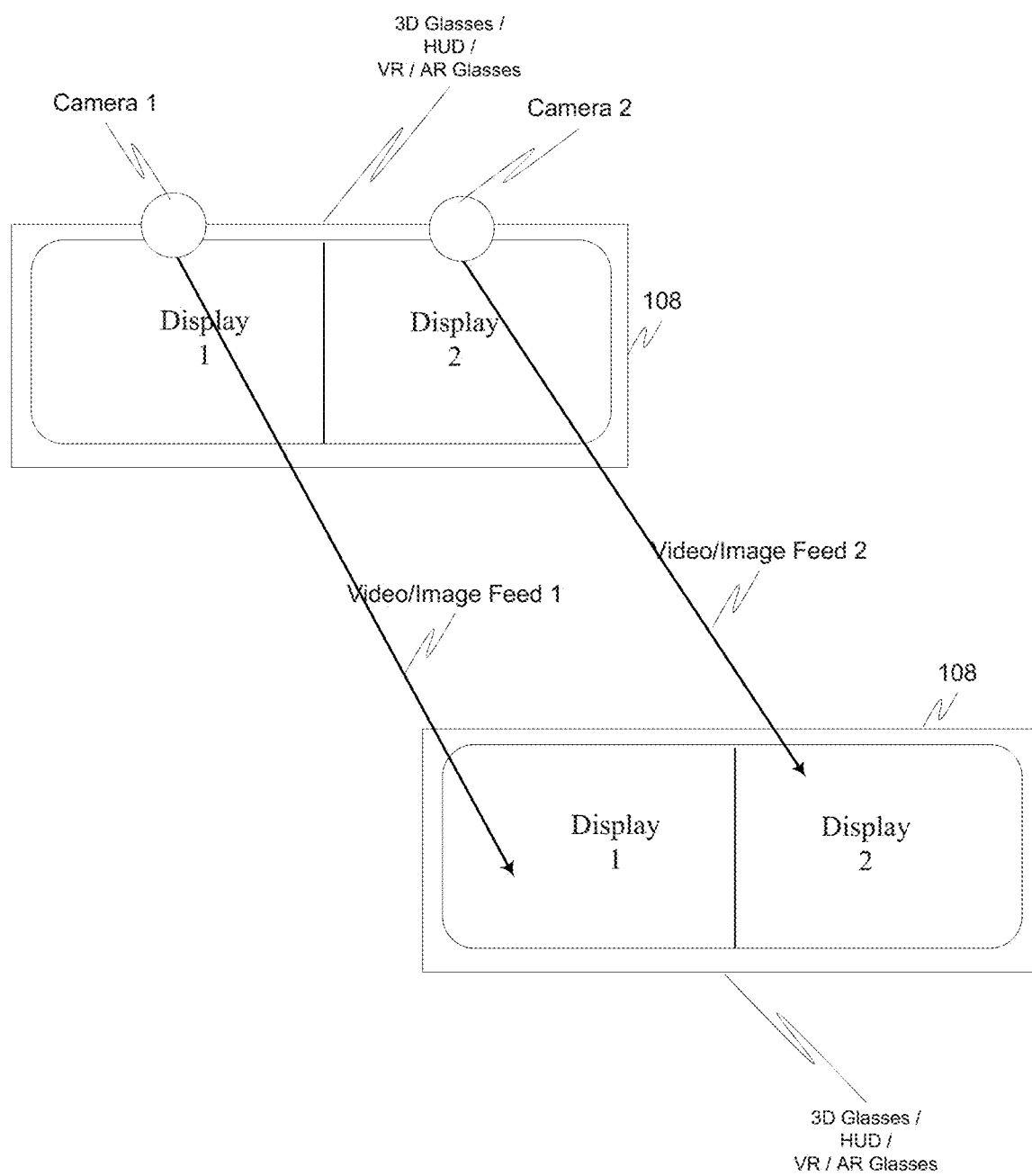
FIG. 11 illustrates a further aspect of the viewer.

FIG. 11 illustrates another example of the viewer 108, where the viewer is a pair of 3D glasses, a heads-up display (HUD), a virtual/augmented reality glasses, or the like, similar to FIG. 10, and a first video/image feed from a first camera on another similar viewer 108 with two cameras is received at a first display, and a second video/image feed from a second camera is received at a second display that can be used, for example, for live footage. The viewer 108 operates in the same manner as described herein with one of the first or second video streams being delayed. In this example, one of the viewers 108 has the two cameras with the corresponding video/image feeds that are supplied for display to the displays on the other viewer. As discussed, the feeds can be wired and/or wireless feeds FIGS. 12A-C illustrate a sequence of screen shots from a video demonstration that resembles a user's recording device capturing live footage (e.g., in real-time). The user's hand is detected using pixel change and the user's background (user's legs, feet, walls, windows) (in the left images) is detected as not moving or stationary. The user's hand is then overlaid on a separate video (the right images) giving the appearance that the user's body part is now in the previously recorded video. The stationary background from the user's camera is deleted and/or overlaid with previously recorded footage or footage from another user, or live footage from another user creating the impression that the user is "within" the images in FIGS. 12A-C on the right-hand side.

FIGS. 13-19 outline another optional technique that can be used with any of the technology disclosed herein. Image alignment can have a big impact of the user experience, so it can be important to keep the images aligned to improve the user's experience.

On exemplary purpose of the alignment technique between the left and right viewing screens is to allow for a better and clearer viewing performance, especially in instances where the camera feed may be shaky, or where differences between frames vary quite significantly. In a scenario where the camera feed is shaky, or where objects between frames vary on a horizontal or vertical axis (depending on how the video or image feed is captured), the user's view may appear blurry. An example of this scenario could occur if the video is captured by a user while running or jumping up and down, rather than the video or image feed being captured in a more stabilized method such as the feed being captured using a tri-pod or stabilization device.

By incorporating an alignment technique, which could include one or more of vertical and/or horizontal alignment, the frames of the left and right viewing screens will have similar, but not necessarily exact, alignment of objects, thus making the user's view clearer and improving the user's experience. The alignment technique could incorporate a process of aligning frames between left and right viewing screens and may also allow for the input video or image feed to be "zoomed-in on" or "zoomed-out of" within the viewing screens to allow for the frames to be adjusted in such a way as to align the frames of both the left and right viewing screens to create a more clear and improved viewing experience.

In accordance with one embodiment, the video input feed can be stabilized using a process to detect the amount of pixels (or visual performance characteristics) that change between frames within a video/image/motion image feed.

Figure 13:
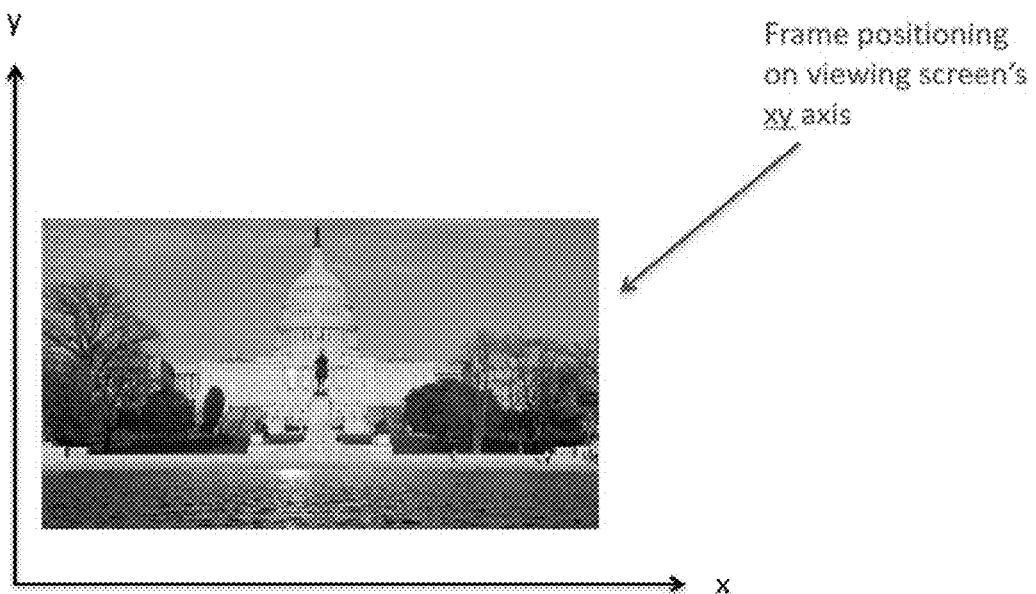
FIGS. 13-19 illustrate a video sequence alignment technique according to another aspect of the disclosure.

Based on the amount of pixels (or visual performance characteristics) that change between frames, the video and/or image feed will then be aligned on the viewing screen's x-axis and/or y-axis (as seen in FIG. 13) for the left and/or right viewing screen(s). Such technique can be applied to a single viewing screen and/or may also be applied to both the left viewing screen and right viewing screen simultaneously or at different time intervals.

In another scenario, once the frame(s) within the first screen has/have been stabilized using the above process, the frame(s) within the second screen may be aligned accordingly based on the pixels (or visual performance characteristics) of the first screen.

The video/image/motion image feed viewed on one or both viewing screens can also be zoomed-in-on or zoomed-out-of. Also, the video/image/motion image can either be expanded or made smaller within the left and/or right viewing screen(s).

In addition, the first viewing screen may contain an input feed that has been stabilized using the process/processes described above and the second viewing screen will then follow the process of incorporating a time delay based on the amount of pixels (or visual performance characteristics) that change between frames of the first viewing screen.

Figure 14:
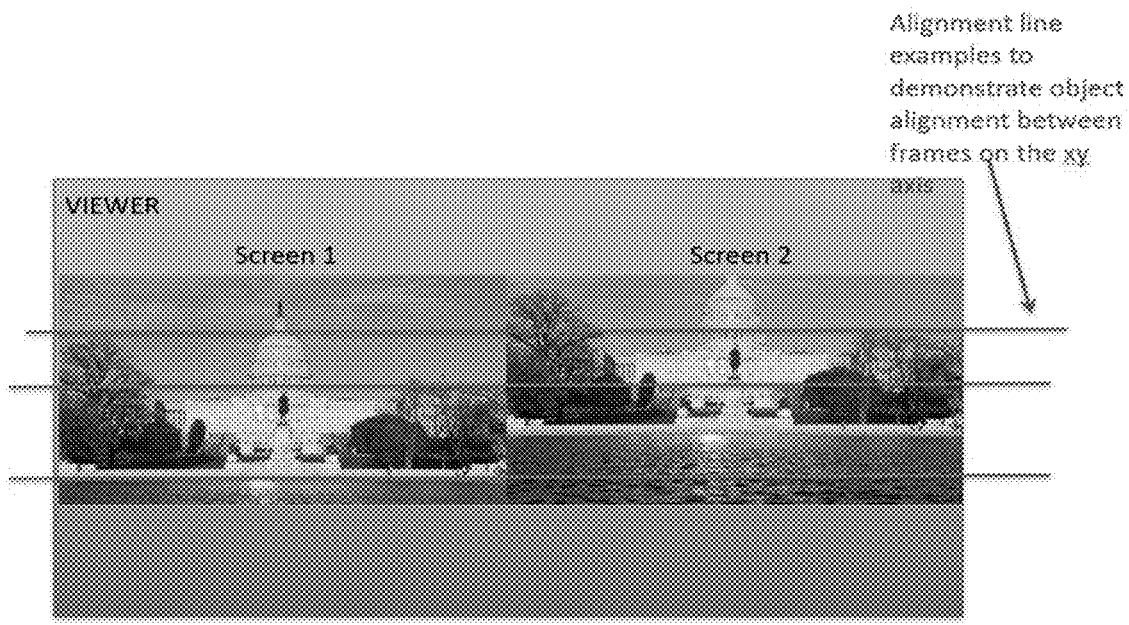
Figure 15:
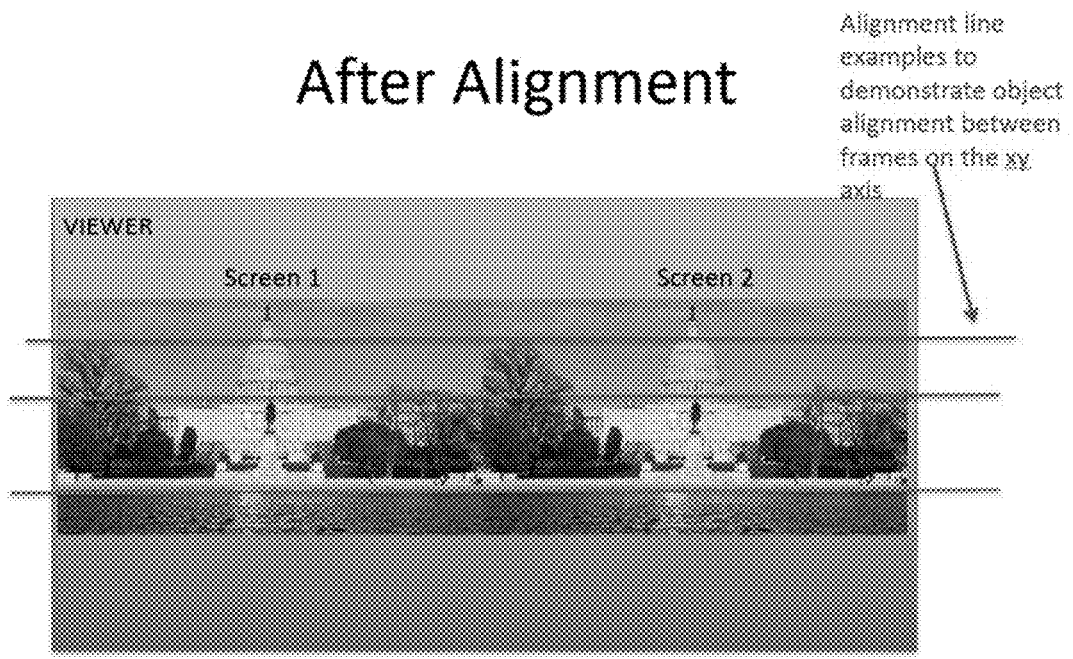
Figure 16:
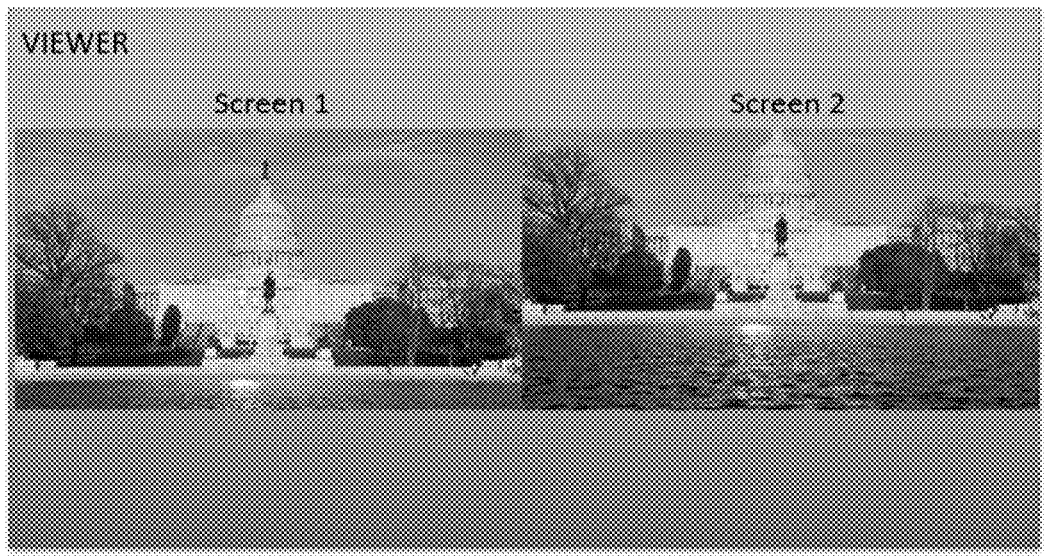
Figure 17:
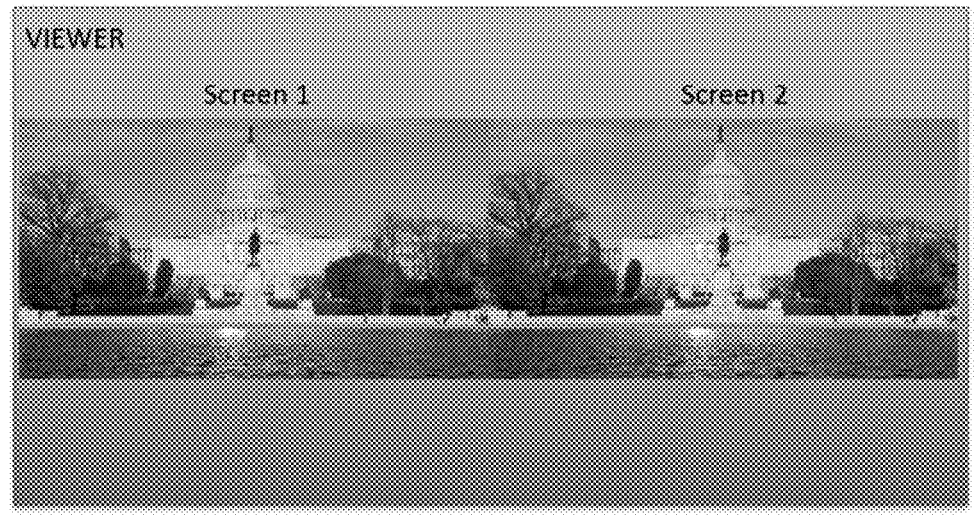
Figure 18:
Figure 19:

By incorporating such a process/processes, the overall viewing performance will be enhanced. As illustrated in the figures. Specifically, FIG. 14 shows an example of an image on screen 1 and screen 2 where the images are not aligned. FIG. 15 shows where the same image has been aligned on screen 1 and screen 2 such that the images are aligned. FIGS. 16 and 17 contrast the images shown on screen 1 and screen 2 before and after alignment with FIGS. 18 and 19 showing the same images from the user's perspective before and after alignment, respectively. FIG. 19 shows a clearer image that improves the user's experience.

In accordance with one exemplary alignment technique, a translation is a transformation that occurs when a figure, or in this case a video/image frame, is moved from one location to another location without altering its size, shape, or orientation. The translation can be shown in the coordinate plane, or display screen, based on the direction of movement and the distance the frame should be moved.

If a frame undergoes a translation, the frame can be adjusted along the x-axis and/or y-axis of the display.

To translate the frame $F(x,y)$, a units right and b units up, the equation would be as follows: $F'(x+a,y+b)$ To translate the frame $F(x,y)$, a units left and b units down, the equation would be as follows: $F'(x-a,y-b)$ To translate the frame $F(x,y)$, a units right and b units down, the equation would be as follows: $F'(x+a,y-b)$ To translate the frame $F(x,y)$, a units left and b units up, the equation would be as follows: $F'(x-a,y+b)$ Example 1

In Display 1, the frame stays stationary and the formula for the frame (F1) within the display can be demonstrated as $F1(x,y)$. At the same time, the frame appearing in Display 2 (F2) can be translated 5 units right and 3 units down. In this case the following formula would apply for Display 2: $F2(x+5,y-3)$.

Example 2

In Display 2, the frame stays stationary and the formula for the frame (F2) within the display can be demonstrated as $F2(x,y)$. At the same time, the frame appearing in Display 1 (F1) can be translated 3 units right and 4 units down. In this case, the following formula would apply for Display 1: $F1(x+3,y-4)$.

To demonstrate a zoom-in-on or zoom-out-of feature, the z-axis coordinate would therefore become applicable.

In a "zoom-in-on" feature, to adjust the frame $F(x,y,z)$, a units right, b units up, and increase c units in depth, the equation would be as follows: $F'(x+a,y+b,z+c)$ In a "zoom-out-of" feature, to adjust the frame $F(x,y,z)$, a units right, b units up, and reduce c units in depth, the equation would be as follows: $F'(x+a,y+b,z-c)$ The above equations demonstrate the ability to adjust a frame along a coordinate plane on one or both displays at either the same time or different time intervals to minimize blur and improve clarity for the viewer. The above demonstrated equations can be adjusted accordingly and are not meant to limit the scope of the process, but rather to clarify one exemplary process that can be used to adjust frames between Display 1 and Display 2 in order to produce a more enhanced viewing experience, especially when a time delay between pixels, or visual performance characteristic change of a pixel, is incorporated.

While the above described flowchart has been discussed in relation to a particular sequence of events, it should be appreciated that changes to this sequence can occur without materially affecting the operation of the embodiment(s). Additionally, the exact sequence of events need not occur as set forth in the exemplary embodiments. Additionally, the exemplary techniques illustrated herein are not limited to the specifically illustrated embodiments, but can also be utilized with the other exemplary embodiments and each described feature is individually and separately claimable.

The above-described systems and methods can be implemented in software using object or object-oriented software development environments that provide portable source code that can be used on a variety of computer or workstation platforms. This conversion system may be implemented in a website, or application. The conversion process may take place on a user device, following receiving a 2D video, or the conversion process may take place on a server prior to streaming the post-conversion video. The system may be implemented in a website, wherein a user may upload, or choose from an internet source, a 2D video to be converted. The system may also be incorporated into third-party applications giving the third party and/or a user the ability to view a 2D video, video game, or image in 3D using the conversion process. The process, and any of its embodiments, may also be used in accordance with other 3D technology, including but not limited to: 3D gaming, 3D streaming, 3D imaging/video technology, 3D betting, 3D rendering, 3D visualization, 3D medical visualization, etc.

In accordance the present disclosure, embodiments of the present disclosure may be configured as follows:

(1) A mobile device for converting a two-dimensional video sequence into first and second video sequences for display at first and second display areas of a single display is provided. The mobile device may comprise a processor; and memory, wherein the memory contains one or more processor-executable instructions that when executed, cause the one or more processors to: receive the two-dimensional video image sequence, output to the first display area, a first video image sequence, and output to the second display area, a second video image sequence different from the first video image sequence, wherein the first and second video image sequences are created from the two-dimensional video image sequence.

(2) The method of (1) above, where a first frame playback of one of the first and second video image sequence is offset by a time delay.

(3) The method of (2) above, where an amount of the time delay is based on an amount of pixels that change from a first frame of the two-dimensional video sequence to a second frame of the two-dimensional video sequence.

(4) The method of (3) above, where a location of the first display area on the single display changes based on a user input.

(5) The method according to any one of (1) to (4) above, where a frame rate of the first video image sequence is different from a frame rate of the second video image sequence.

(6) The method according to any one of (1) to (5) above, further including splitting the two-dimensional video sequence into the first and second video image sequences, and delaying a playback of a first portion the first video image sequence with respect to the second video image sequence.

(7) The method according to (6) above, where a frame rate of the first video image sequence is different from a frame rate of the second video image sequence, and where at a first point in time, content of a frame of the first video image sequence displayed at the first display area is the same as content of a frame of the second video image sequence displayed at the second display area.

(8) The method according to (7) above, where at a second point in time, content of another frame of the first video image sequence displayed at the first display area is different from content of another frame of the second video image sequence displayed at the second display area.

(9) The method according to any one of (6) to (8) above, where at least one frame of the two-dimensional video sequence is not displayed at the first display area.

(10) The method according to any one of (1) to (9) above, where the mobile device is coupled to a virtual-reality headset.

(11) A method of simulating a three-dimensional video from a two-dimensional video, the method including receiving the two-dimensional video, displaying, at a first display area, a first video image sequence, and displaying, at a second display area, a second video image sequence different from the first video image sequence, wherein the first and second video image sequences are created from the two-dimensional video, and wherein the first and second display areas are common to a display of a mobile device.

(12) The method according to (11) above, where a first frame playback of one of the first and second video image sequences is offset by a time delay.

(13) The method according to (12) above, where an amount of the time delay is based on an amount of pixels that change from a first frame of the two-dimensional video to a second frame of the two-dimensional video.

(14) The method according to any one of (11) to (13) above, further including moving a location of the first display area on the display of the mobile device with respect to the second display area on the display of the mobile device.

(15) The method according to any one of (11) to (14) above, further including adjusting a frame rate of the first video image sequence such that the frame rate of the first video image sequence is different from a frame rate of the second video image sequence.

(16) The method according to any one of (11) to (15) above, further including splitting the two-dimensional video sequence into the first and second video image sequences, and delaying a playback of a first portion the first video image sequence with respect to the second video image sequence.

(17) The method according to (16) above, further including adjusting a frame rate of the first video image sequence such that the frame rate of the first video image sequence is different from a frame rate of the second video image sequence, wherein at a first point in time, content of a frame of the first video image sequence displayed at the first display area is the same as content of a frame of the second video image sequence displayed at the second display area.

(18) The method according to any one of (11) to (17) above, further including attaching the mobile device to a virtual reality headset.

(19) The method according to any one of (11) to (18) above, where at least one frame of the two-dimensional video sequence is not displayed at the first display area.

(20) A computer-readable device including one or more processor-executable instructions that when executed, cause one or more processors to perform a method according to any one of (11) to (19) above.

(21) The device/method/computer-readable device according to any one of (1) to (20), wherein one or more frames of the first video sequence are reorganized such that an order of frames within a portion of the first video sequence are different from an order of frame within a same portion of the second video sequence.

(22) The device/method/computer-readable device according to any one of (1) to (21), wherein the two-dimension video sequence is streamed over a communication network from a content provider.

Moreover, the disclosed systems and methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as a program embedded on one or more personal computers such as an applet, JAVA®, or CGI script, as a resource residing on a server or computer workstation, as a routine embedded in a dedicated communication system or system component or the like. The system can also be implemented by physically incorporating the system and/or method into a software and/or hardware system.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Provided herein are exemplary systems and methods. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A mobile device that converts a two-dimensional video sequence into first and second video image sequences for display at first and second display areas of a display, the mobile device comprising:
    one or more processors; and
    a memory, wherein the memory contains one or more processor-executable instructions that when executed, cause the one or more processors to:
    receive the two-dimensional video image sequence,
    split the two-dimensional video sequence into the first and second video image sequences;
    delay a playback of a first portion the first video image sequence with respect to the second video image sequence based on a pixel change;
    output to the first display area, the first video image sequence, and
    output to the second display area, the second video image sequence different from the first video image sequence, wherein the first and second video image sequences are created from the two-dimensional video image sequence.

2. The mobile device of claim 1, wherein a first frame playback of one of the first and second video image sequence is offset by a time delay.

3. The mobile device of claim 2, wherein an amount of the time delay is based on an amount of pixels that change from a first frame of the two-dimensional video sequence to a second frame of the two-dimensional video sequence.

4. The mobile device of claim 3, wherein a location of the first display area on the single display changes based on a user input.

5. The mobile device of claim 1, wherein a frame rate of the first video image sequence is different from a frame rate of the second video image sequence.

6. The mobile device of claim 5, wherein one or more frames of the first video sequence are reorganized such that an order of frames within a portion of the first video sequence are different from an order of frame within a same portion of the second video sequence.

7. The mobile device of claim 1, wherein the two-dimensional video image sequence is live.

8. The mobile device of claim 1, wherein a frame rate of the first video image sequence is different from a frame rate of the second video image sequence, and wherein at a first point in time, content of a frame of the first video image sequence displayed at the first display area is the same as content of a frame of the second video image sequence displayed at the second display area.

9. The mobile device of claim 8, wherein at a second point in time, content of another frame of the first video image sequence displayed at the first display area is different from content of another frame of the second video image sequence displayed at the second display area.

10. The mobile device of claim 1, wherein at least one frame of the two-dimensional video sequence is not displayed at the first display area.

11. The mobile device of claim 1, wherein the mobile device is coupled to a virtual-reality headset.

12. The mobile device of claim 1, wherein the two-dimension video sequence is streamed over a communication network from a content provider.

13. A method of simulating a three-dimensional video from a two-dimensional video, the method comprising:
    receiving the two-dimensional video;
    splitting the two-dimensional video sequence into the first and second video image sequences;
    delaying a playback of a first portion the first video image sequence with respect to the second video image sequence based on a pixel change;
    displaying, in real-time at a first display area, a first video image sequence; and
    displaying, in real-time at a second display area, a second video image sequence different from the first video image sequence, wherein the first and second video image sequences are created from the two-dimensional video, and wherein the first and second display areas are common to a display of a mobile device.

14. The method of claim 13, wherein a first frame playback of one of the first and second video image sequences is offset by a time delay.

15. The method of claim 14, wherein an amount of the time delay is based on an amount of pixels that change from a first frame of the two-dimensional video to a second frame of the two-dimensional video.

16. The method of claim 13, further comprising:
    moving a location of the first display area on the display of the mobile device with respect to the second display area on the display of the mobile device.

17. The method of claim 13, further comprising:
    adjusting a frame rate of the first video image sequence such that the frame rate of the first video image sequence is different from a frame rate of the second video image sequence.

18. The method of claim 17, further comprising:
    reorganizing one or more frames of the first video sequence such that an order of frames within a portion of the first video sequence are different from an order of frame within a same portion of the second video sequence.

19. The method of claim 13, further comprising:
adjusting a frame rate of the first video image sequence such that the frame rate of the first video image sequence is different from a frame rate of the second video image sequence, wherein at a first point in time, content of a frame of the first video image sequence displayed at the first display area is the same as content of a frame of the second video image sequence displayed at the second display area.

20. The method of claim 13, further comprising:
attaching the mobile device to a virtual reality headset.

21. The method of claim 13, wherein at least one frame of the two-dimensional video sequence is not displayed at the first display area.

22. A non-transitory computer-readable information storage device including one or more processor-executable instructions that when executed, cause one or more processors to:
receive a two-dimensional video image sequence,
split the two-dimensional video sequence into the first and second video image sequences;
delay a playback of a first portion the first video image sequence with respect to the second video image sequence based on a pixel change;
output to a first display area of a mobile device display, a first video image sequence, and
output to a second display area of the mobile device display, a second video image sequence different from the first video image sequence, wherein the first and second video image sequences are created from the two-dimensional video image sequence in real-time.

23. The mobile device of claim 1, further comprising overlaying one video image sequence on top of a second video image sequence and/or gaming feed.

24. The mobile device of claim 23, wherein at least a portion of content on one or more of the video displays is altered or removed.

25. The method of claim 13, further comprising overlaying one video image sequence on top of a second video image sequence and/or gaming feed.

26. The method of claim 25, wherein at least a portion of content on one or more of the video displays is altered or removed.

27. The mobile device of claim 1, wherein the pixel change is: a pixel change between frames, a rate of change between pixels, a color change between pixels, or a visual performance characteristic change of a pixel.

28. The method of claim 13, wherein the pixel change is: a pixel change between frames, a rate of change between pixels, a color change between pixels, or a visual performance characteristic change of a pixel.

29. The mobile device of claim 1, wherein the first and second video image sequences are aligned in one or more of an x direction, a y direction and a z direction.

30. The mobile device of claim 1, wherein the first and second video image sequences are substantially aligned on one or more of the horizontal and vertical axes.

* * * * *